United States Patent [19]
Chery et al.

[11] Patent Number: 6,104,387
[45] Date of Patent: Aug. 15, 2000

[54] TRANSCRIPTION SYSTEM

[75] Inventors: Yonald Chery; Andrew Kelley, III; William P. Moyne; Matthew D. Verminski; Manuel Perez; Peter Lee, all of Cambridge, Mass.

[73] Assignee: Virtual Ink Corporation, Cambridge, Mass.

[21] Appl. No.: 09/079,430

[22] Filed: May 14, 1998

Related U.S. Application Data

[60] Provisional application No. 60/046,485, May 14, 1997.

[51] Int. Cl.[7] .................................................... G09G 5/00
[52] U.S. Cl. ...................... 345/179; 345/178; 178/18.04
[58] Field of Search .................................... 345/173–183, 345/104, 156, 18.01, 18.03–18.07, 18.09–18.1, 19.01–19.07

[56] References Cited

U.S. PATENT DOCUMENTS

| | | | |
|---|---|---|---|
| Re. 33,936 | 5/1992 | Miyamori et al. | 178/18 |
| 3,613,066 | 10/1971 | Cooreman et al. | 340/347 |
| 3,706,850 | 12/1972 | Fisher et al. | 178/18 |

(List continued on next page.)

FOREIGN PATENT DOCUMENTS

| | | | |
|---|---|---|---|
| 0 169 538 A2 | 1/1986 | European Pat. Off. | G06K 11/06 |
| 0 284 048 A2 | 9/1988 | European Pat. Off. | G06K 11/06 |
| 0 623 872 A1 | 11/1994 | European Pat. Off. | G06F 3/033 |
| 0 772 149 A1 | 6/1997 | European Pat. Off. | G06K 11/18 |
| 2 042 726 | 9/1980 | United Kingdom | G01S 5/18 |
| 2 097 922 | 11/1982 | United Kingdom | G01S 5/18 |
| 2 334 003 | 8/1999 | United Kingdom | G08C 21/00 |
| WO 89/11144 | 11/1989 | WIPO | G09G 3/02 |
| WO 94/11844 | 5/1994 | WIPO | G06K 11/14 |
| WO 94/16422 | 7/1994 | WIPO | G08C 21/00 |
| wo 96/10817 | 4/1996 | WIPO | G10K 11/28 |
| WO 98/14888 | 4/1998 | WIPO | G06F 15/00 |
| WO 98/37508 | 8/1998 | WIPO . | |
| WO 98/38595 | 9/1998 | WIPO . | |
| WO 98/38596 | 9/1998 | WIPO . | |
| WO 98/39729 | 9/1998 | WIPO . | |
| WO 98/40838 | 9/1998 | WIPO . | |
| WO 99/36883 | 7/1999 | WIPO | G06K 11/18 |

OTHER PUBLICATIONS

Chery, Y. et al., "Detector for Use in a Transcription System", U.S. Patent Application Serial No. 09/273,883, filed Mar. 22, 1999. (707).

Chery, Y. et al., "Method for Calibrating a Transcription System", U.S. Patent Applicaton Serial No. 09/274,139, filed Mar. 22, 1999. (708).

Chery, Y. et al., "Stylus for Use With Transcription System", U.S. Patent Application Serial No. 09/274,136, filed Mar. 22, 1999. (709).

Chery, Y. et al., "Collapsible Detector Assembly", U.S. Patent Application Serial No. 09/274,267, filed Mar. 22, 1999. (710).

Chery, Y. et al., "Detector Assembly With Board Mounted User Controls", U.S. Patent Application Serial No. 09/273,593, filed Mar. 22, 1999. (711).

Chery, Y. et al;., "Transcription System Kit", U.S. Patent Application Serial No. 09/274,137, filed Mar. 22, 1999. (712).

Chery, Y. et al., "Transcription System Kit For Forming Composite Images", U.S. Patent Application Serial No. 09/273,887, filed Mar. 22, 1999. (713).

Chery, Y. et al., "Transcription System Kit Including Stylus and Powered Writing Element", U.S. Patent Application Serial No. 09/273,921, filed Mar. 22, 1999. (719).

*Primary Examiner*—Lun-Yi Lao
*Attorney, Agent, or Firm*—Wilson Sonsini Goodrich & Rosati; David J. Weitz

[57] ABSTRACT

A system is provided for recording writing performed on a surface. The system includes a stylus having a housing and a writing element; two or more detectors which may be permanently or removably affixed to a writing surface; and a processing unit. The stylus and detectors are used in combination to detect the position of the stylus on the writing surface relative to the detectors based on a time of flight of a ranging medium propagated between the stylus and detectors. The relative position of the stylus is determined at multiple times during which the stylus is being employed in order to record the writing on the surface.

17 Claims, 22 Drawing Sheets

U.S. PATENT DOCUMENTS

| | | | |
|---|---|---|---|
| 3,731,273 | 5/1973 | Hunt | 340/16 |
| 3,838,212 | 9/1974 | Whetstone et al. | 179/18 |
| 4,012,588 | 3/1977 | Davis et al. | 178/18 |
| 4,246,439 | 1/1981 | Romein | 178/18 |
| 4,294,543 | 10/1981 | Apple et al. | 356/375 |
| 4,317,005 | 2/1982 | de Bruyne | 178/19 |
| 4,357,672 | 11/1982 | Howells et al. | 364/561 |
| 4,488,000 | 12/1984 | Glenn | 178/18 |
| 4,506,354 | 3/1985 | Hansen et al. | 367/101 |
| 4,558,313 | 12/1985 | Garwin et al. | 367/709 |
| 4,577,057 | 3/1986 | Blesser | 178/18 |
| 4,578,768 | 3/1986 | Racine | 364/560 |
| 4,654,648 | 3/1987 | Herrington et al. | 345/179 |
| 4,670,751 | 6/1987 | Enokido et al. | 340/706 |
| 4,688,933 | 8/1987 | Lapeyre | 356/3.16 |
| 4,758,691 | 7/1988 | de Bruyne | 178/19 |
| 4,777,329 | 10/1988 | Mallicoat | 178/18 |
| 4,814,552 | 3/1989 | Stefik et al. | 178/18 |
| 4,991,148 | 2/1991 | Gilchrist | 367/124 |
| 5,023,408 | 6/1991 | Murakami et al. | 178/19 |
| 5,043,950 | 8/1991 | Schorum et al. | 367/98 |
| 5,050,134 | 9/1991 | Butler | 367/118 |
| 5,107,541 | 4/1992 | Hilton | 382/3 |
| 5,142,506 | 8/1992 | Edwards | 367/127 |
| 5,144,594 | 9/1992 | Gilchrist | 367/129 |
| 5,248,856 | 9/1993 | Mallicoat et al. | 178/18 |
| 5,250,929 | 10/1993 | Hoffman et al. | 345/146 |
| 5,280,457 | 1/1994 | Figuero et al. | 367/127 |
| 5,298,737 | 3/1994 | Proper | 250/221 |
| 5,308,936 | 5/1994 | Biggs et al. | 178/18 |
| 5,311,207 | 5/1994 | Kusumoto et al. | 345/150 |
| 5,379,269 | 1/1995 | Sindeband et al. | 367/127 |
| 5,420,607 | 5/1995 | Miller et al. | 345/156 |
| 5,434,370 | 7/1995 | Wilson et al. | 178/18 |
| 5,557,301 | 9/1996 | D'Aviau de Piolant | 345/179 |
| 5,576,727 | 11/1996 | Rosenberg et al. | 345/179 |
| 5,583,323 | 12/1996 | Zurstadt et al. | 178/18 |
| 5,691,959 | 11/1997 | Kriewall et al. | 367/129 |
| 5,717,168 | 2/1998 | DeBuisser et al. | 345/158 |
| 5,864,335 | 1/1999 | Kuzunuki et al. | 345/173 |
| 5,956,020 | 9/1999 | D'Amico et al. | 345/173 |

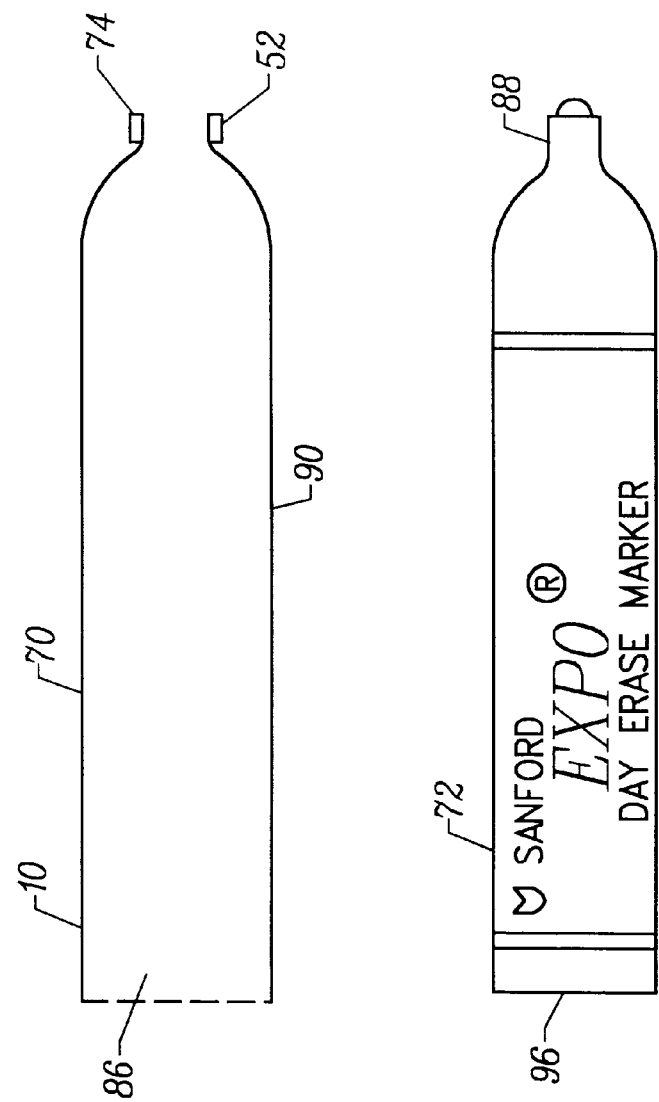
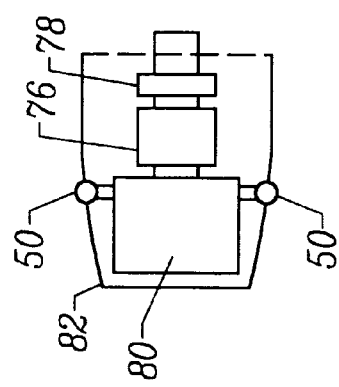
FIG. 3B

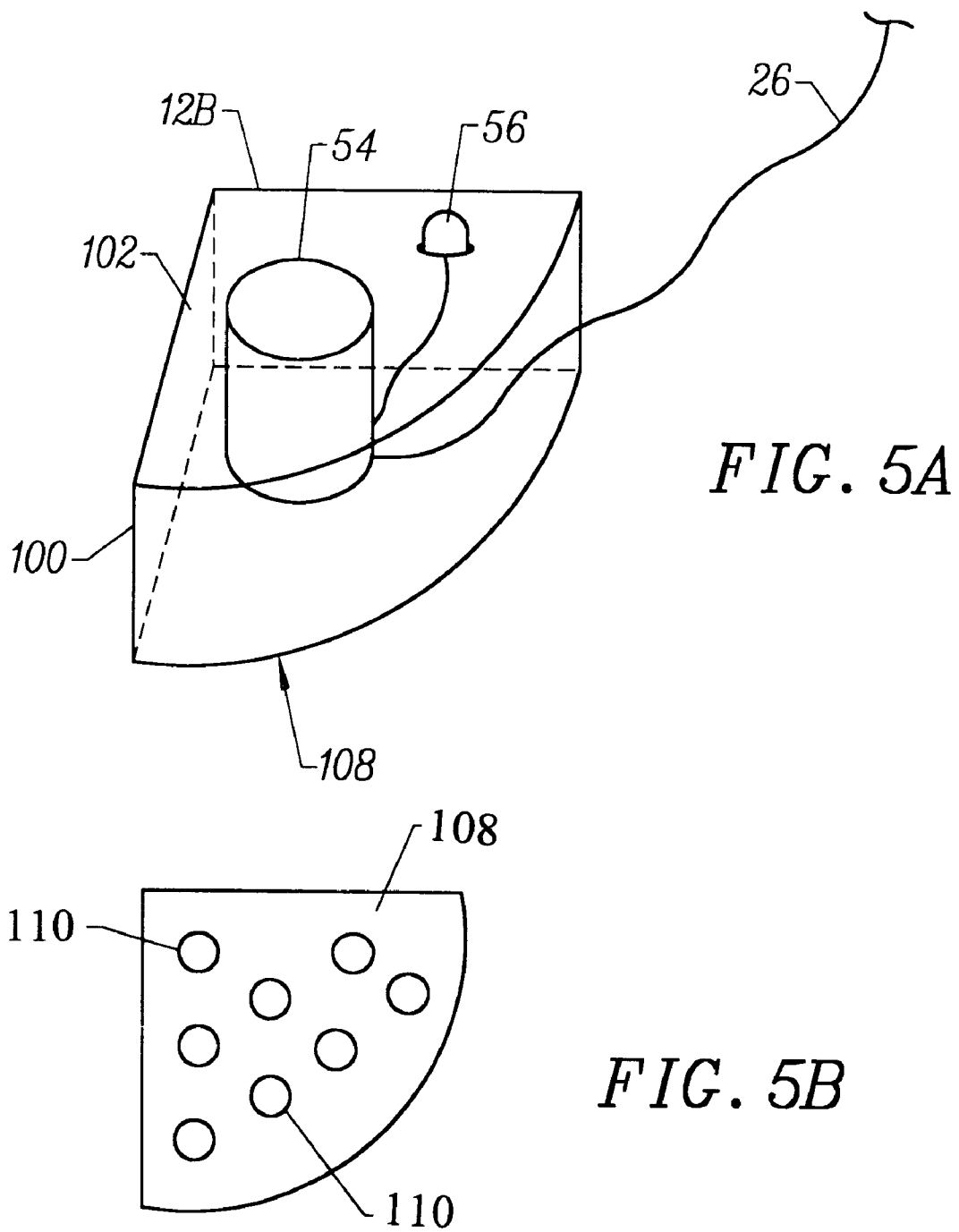

$$x = \frac{r^2 - l^2 - W^2}{2W} \quad \text{Equation 1}$$

$$y = (l^2 - x^2)^{\frac{1}{2}} \quad \text{Equation 2}$$

6,104,387

TRANSCRIPTION SYSTEM

CROSS-REFERENCE TO RELATED APPLICATIONS

This application is a Continuation-in-Part of U.S. Provisional application Ser. No. 60/046,485; filed May 14, 1997; entitled Transcription Device which is incorporated herein by reference.

BACKGROUND OF THE INVENTION

1. Field of the Invention

The invention relates to a system and method for recording writing performed on a surface, and more particularly to system and method wherein a stylus containing a writing element is tracked using a ranging medium.

2. Description of Related Art

Existing technologies for capturing and storing handwritten notes include digitized writing surfaces such as electronic whiteboards or SmartBoards™. These electronic whiteboards typically either photocopy an entire writing surface or serve as the actual input device (e.g. and electronic template) for capturing the handwritten data. The whiteboards may be active or passive electronic devices where the user writes on the surface with a special stylus. The active devices may be touch sensitive, or responsive to a light or laser pen wherein the whiteboard is the detector that detects the active signal. The passive electronic boards tend to use large, expensive, board-sized photocopying mechanisms. As a result, the whiteboard systems of the related art are large, cumbersome, expensive, and immobile.

SUMMARY OF THE INVENTION

The invention relates to stylus for use in a transcription system. The stylus includes a housing defining a volume within which a writing element may be removably positioned and a cap for immobilizing the writing element within the volume. The stylus also includes a contact switch for sensing when the writing element is contacted with a writing surface and a position signal transmitter for transmitting a plurality of position signals when the writing element is sensed by the contact switch to be in contact with the writing surface.

In another embodiment, the stylus includes a writing element and a contact switch for sensing when the writing element is contacted with a writing surface. The stylus also includes a position signal transmitter for transmitting a plurality of position signals when the writing element is sensed by the contact switch to be in contact with the writing surface.

In yet another embodiment, the stylus includes a housing defining a volume within which a writing element may be removably positioned and a cap for immobilizing the writing element within the volume. The stylus can also include a contact switch for sensing when the writing element is contacted with a writing surface. The stylus can further include a position signal receiver for receiving a plurality of position signals and a reference signal transmitter for transmitting a reference signal when the writing element is sensed by the contact switch to be in contact with the writing surface.

In a further embodiment, the stylus includes a writing element and a contact switch for sensing when the writing element is contacted with a writing surface. The stylus can also include a position signal receiver for receiving a plurality of position signals and a reference signal transmitter for transmitting a reference signal when the writing element is sensed by the contact switch to be in contact with the writing surface.

BRIEF DESCRIPTION OF THE FIGURES

FIG. 3B is a sideview of a stylus including a removable cap.

FIG. 5A is a sideview of a detector.

FIG. 5B is a bottomview of a detector.

DETAILED DESCRIPTION

The present invention relates to a system, instruments used in the system, and a method for recording writing performed on a surface. Writing is intended to include the formation of any type of image on a surface, including printing, drawing, sketching and the like. The surface on which the writing is performed may be any surface on which writing may be performed. The surface is preferably a relatively smooth flat surface. Examples of suitable surfaces include but are not limited to whiteboards, blackboards, clipboard, desktops, and walls, whether or not covered by a material such as paper or plastic which can be written upon.

In a system according to the present invention, a stylus including a housing and a writing element is provided. The writing element may optionally be removable from the housing. Also provided are two or more detectors which may be permanently or removably affixed to a writing surface and are used in combination with the stylus to detect the position of the stylus on the writing surface. Also provided in the system is hardware for controlling when reference and position signals, described herein, are sent between the stylus and the two or more detectors.

The system may also include a processing unit which contains logic and processing capabilities for performing the various calibration and calculation functions necessary to determine the position of the stylus relative to the two or more detectors at multiple times over a period of time that the stylus is used to write. Alternatively, the system may produce signals corresponding to timing data which can be communicated to a processor external to the system for providing positioning data.

Incorporated into the stylus and the plurality of detectors are one or more transmitters for transmitting a ranging medium and one or more receivers for receiving the ranging medium. Used in combination, the one or more transmitters and one or more receivers determine a separation between the stylus and the plurality of detectors based on a time of flight of the ranging medium between them which can be used to determine a positioning of the stylus. As will be discussed herein in greater detail, a variety of ranging media can be used including, for example, ultrasound and radar.

Figure 1A:
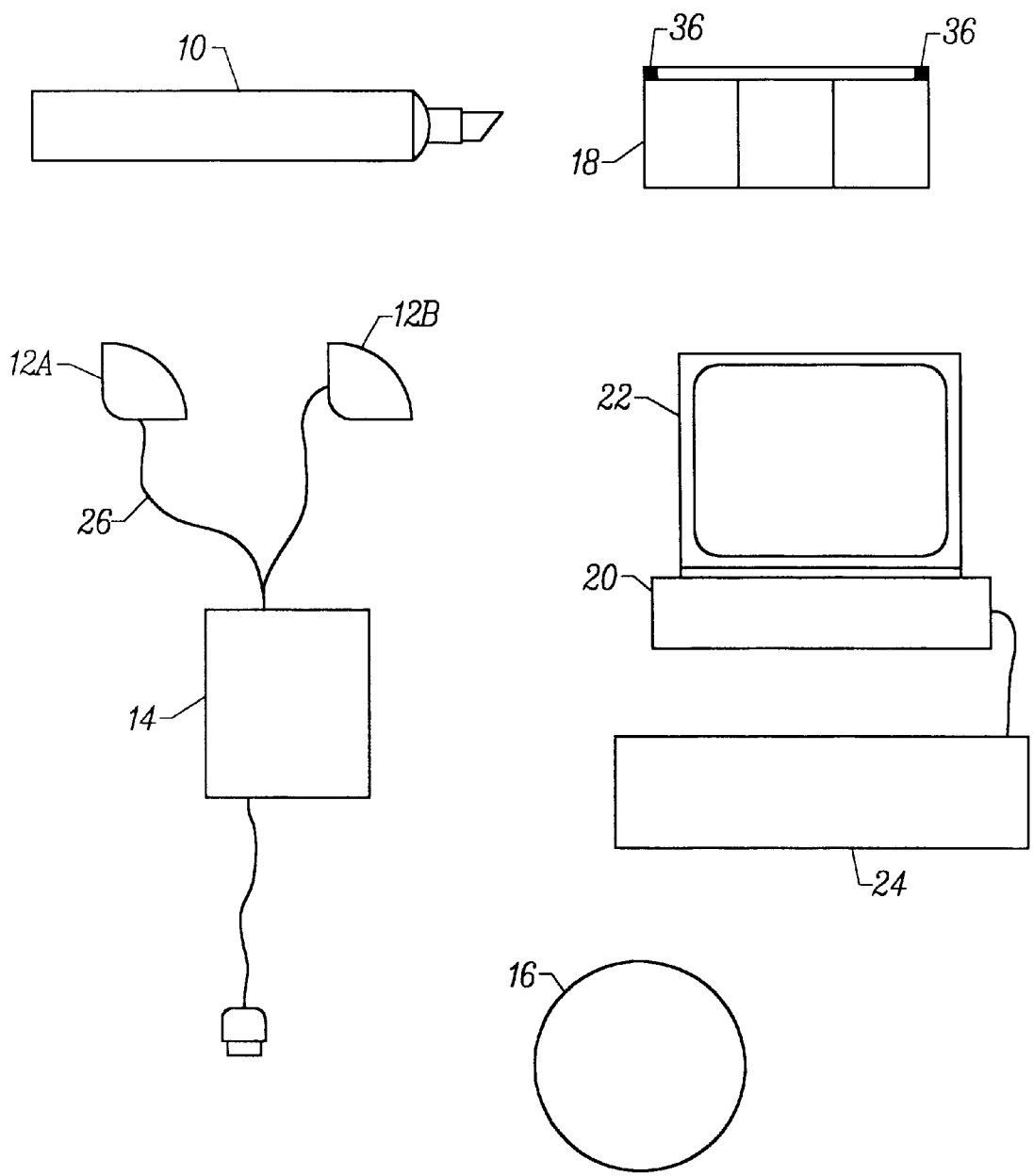
FIG. 1A illustrates the components of a transcription system.

FIG. 1A illustrates one embodiment of a transcription system according to the present invention. As illustrated, the system includes a stylus 10, a first detector 12A, a second detector 12B, and a hardware unit 14. As also illustrated, the system can optionally also include an eraser 16, calibration pad 18, processing unit 20, monitor 22, and user interface 24. As illustrated in FIG. 1A, signals from the first detector 12A and the second detector 12B may be transmitted to the hardware unit 14 through a wire 26. These signals may be electrical or optical in nature. The signals can also be transmitted wirelessly to the hardware unit 14, for example through a form of electromagnetic radiation. As will be explained herein, the system can also be designed such that signals are transmitted to the hardware unit 14 from the stylus 10. Again, these signals may be transmitted to the hardware unit 14 through a wire 26 or wirelessly.

Figure 1B:
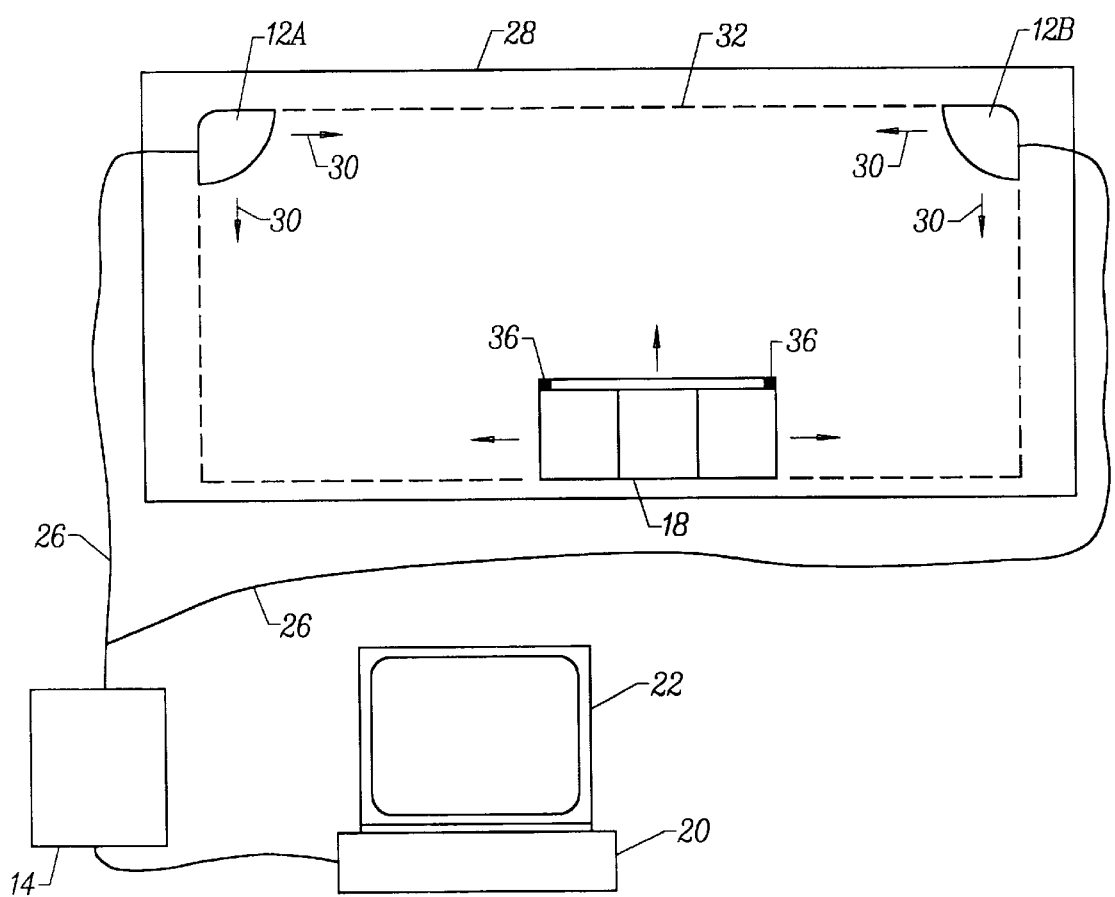
FIG. 1B illustrates installation of the transcription system.

FIG. 1B illustrates how the transcription system illustrated in FIG. 1A may be installed relative to a writing surface 28. As illustrated, the first detector 12A and the second detector 12B are removably coupled to the writing surface 28. It is noted that the first detector 12A and the second detector 12B may be embodied in a single element where the first detector 12A and the second detector 12B are separated from each other by a fixed distance (not shown). It is also noted that the first detector 12A and the second detector 12B may optionally be permanently attached to the writing surface 28.

As illustrated by the arrows 30, the first detector 12A and second detector 12B can be placed anywhere on the writing surface 28. However, it is generally preferred that the first detector 12A and the second detector 12B be positioned adjacent an edge, preferably a corner of the writing area 32 of the writing surface 28.

When the system includes a calibration pad 18 as illustrated in FIGS. 1A and 1B, the calibration pad 18 is preferably positioned at a distance from the first detector 12A and the second detector 12B. For example, the calibration pad 18 is illustrated as being positioned on an opposite side of the writing area 32 relative to the first detector 12A and the second detector 12B. Where possible, the calibration pad 18 is more preferably positioned approximately equidistant from each of the first detector 12A and the second detector 12B on the opposite side of the writing area 32 from the first detector 12A and the second detector 12B. Although the calibration pad 18 is shown to be removably attachable to the writing surface 28, it is noted that the calibration pad 18 may also optionally be permanently attached to the writing surface 28.

One advantage of the transcription system of the present invention is the ability of the transcription system to be readily attached to and detached from different writing surfaces. This enables the transcription system to be portable and be used with different writing surfaces and with different sized writing surfaces.

Figure 1C:
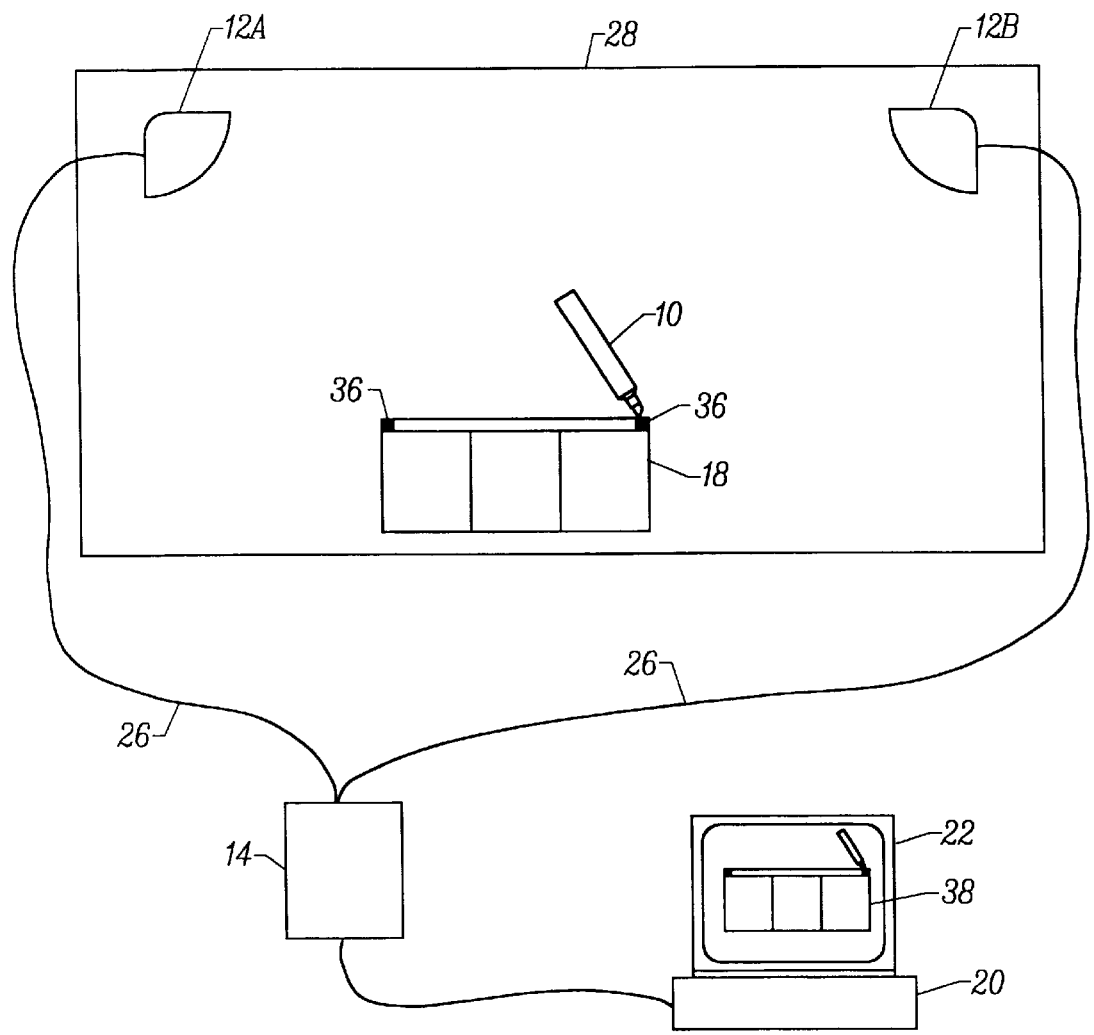
FIG. 1C illustrates the calibration of a transcription system.

FIG. 1C illustrates the use of the calibration pad 18 to calibrate the transcription system. As will be explained herein, when the transcription system is used with different writing surfaces and with different sized writing surfaces, it may be necessary to calibrate the system. As illustrated, during the calibration, the user contacts two or more different calibration points 36 of the calibration pad 18 with the stylus 10.

As illustrated, the processing unit 20 may optionally produce a calibration pad image 38 on the monitor 22 to direct a user with regard to how to calibrate the system. For instance, the calibration pad image 38 can show a stylus 10 contacting a calibration point 36 of the calibration pad image 38. In response, the user can contact the stylus 10 with the calibration point 36 of the calibration pad 18 as illustrated. The transcription system will be calibrated after the user follows the sequence of prompts. Because the transcription system is easily calibrated by the user, the transcription system is readily usable with different sized writing surfaces.

Figure 1D:
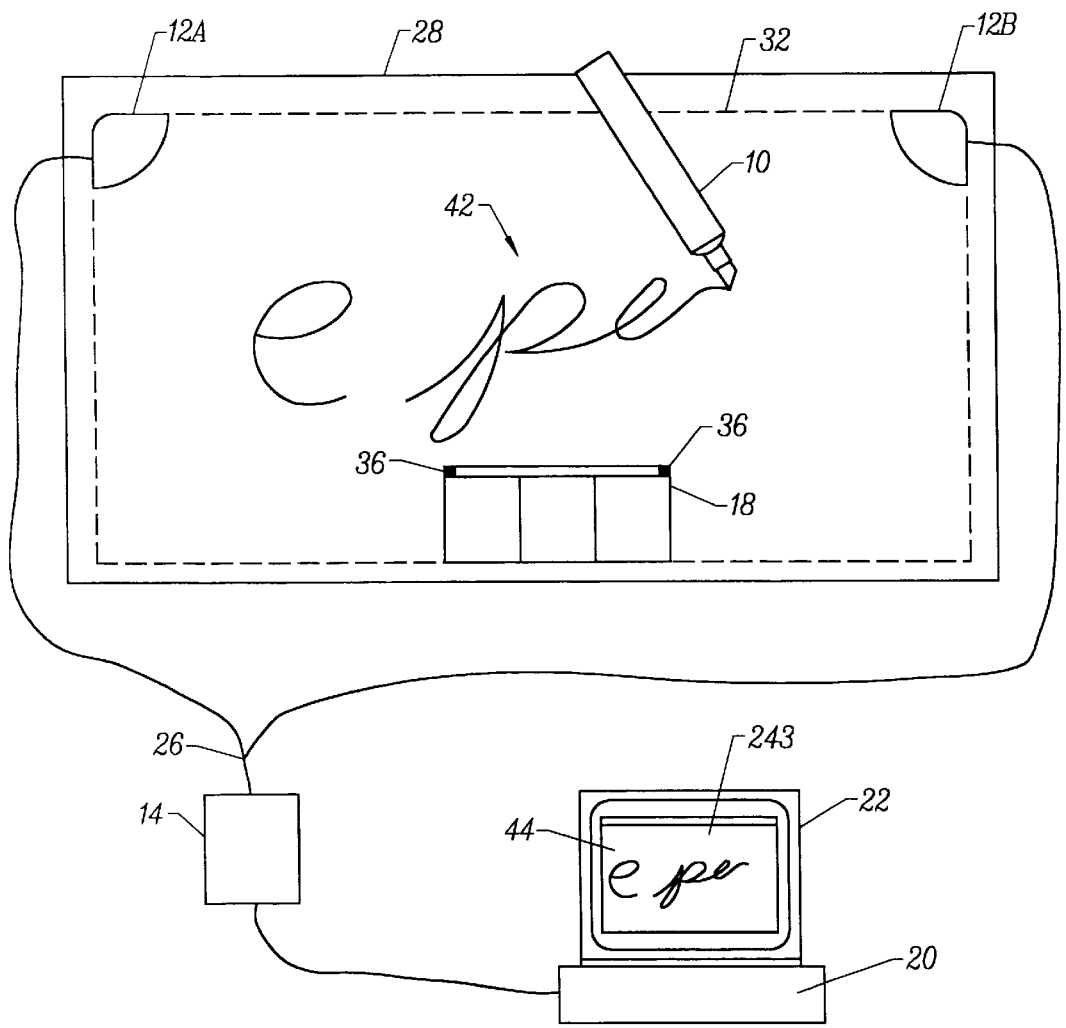
FIG. 1D illustrates the operation of a transcription system.

After the transcription system has been calibrated, the system is generally ready for use. As illustrated in FIG. 1D, the user can write in the writing area 32 with the stylus 10. While the user is creating an image in the writing area 32, a similar image appears on the monitor 22. The image in the writing area 32 is called the written image 42 and the image on the monitor 22 is called the monitor image 44. The monitor image 44 can be stored for later manipulation or for forwarding to another location.

Figure 1E:
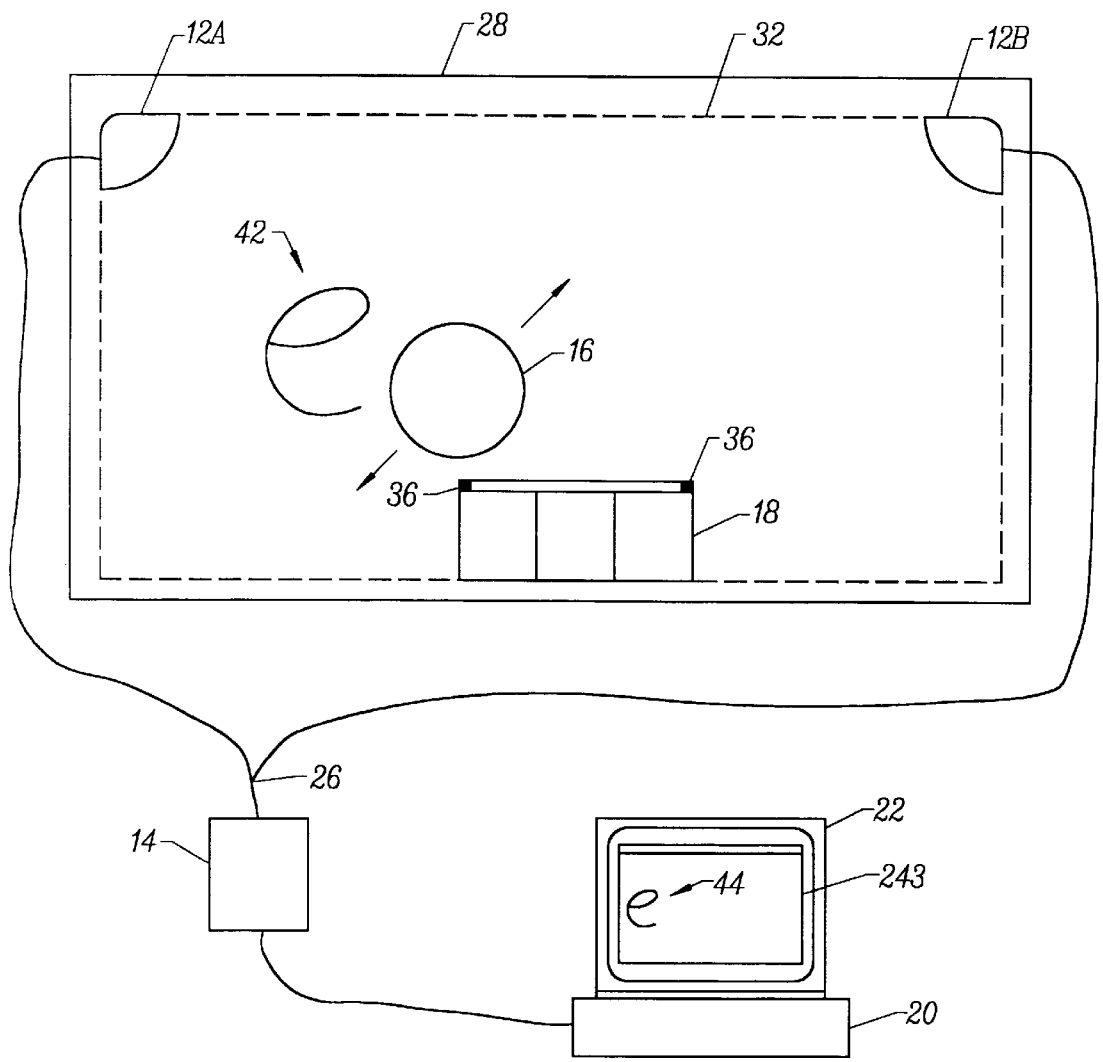
FIG. 1E illustrates the operation of an eraser which can be used with a calibration system.

The written image 42 can also be erased using an eraser 16. As illustrated in FIG. 1E, the monitor image 44 is erased as the written image 42 is erased using the eraser 16.

The calibration pad 18 can be designed to perform a variety of different system functions. For example, placing the stylus 10 in a particular input section of the calibration pad 18 can cause the monitor image 44 to be saved, cause the monitor image 44 to be erased, create a new file into which a new monitor image 44 may be recorded, enable or disable selected functions, change or select the color of the monitor image 44 being drawn using the stylus 10. A wide variety of additional system functions can be envisioned and are intended to fall within the scope of the present invention.

The calibration pad 18 can be constructed from any flat material suitable for attaching to a flat surface. The input section 46 can be defined with different colored section of the calibration pad 18 or outlined section of the calibration pad 18. The input sections 46 of the calibration pad 18 allow the user to control the monitor image 44 without using the user interface 24.

In general, the transcription system records the written image 42 by detecting the position of the stylus 10 on the writing surface 28 at multiple times, each position detected serving to form a point on the monitor image 44. By detecting the position of the stylus 10 at a sampling rate that is fast relative to the speed with which the stylus 10 is moved during writing, a continuous monitor image 44 can be recorded. As will be described in detail below, each point is determined based on the time that it takes for the ranging medium to travel between the stylus 10 and the first detector 12A and the second detector 12B. This time is called the position signal's time of flight.

Several different system designs may be employed in order to detect the position of the stylus 10 relative to the first detector 12A and the second detector 12B using the time of flight of the ranging medium between the stylus 10 and the first detector 12A and the second detector 12B. Several of these different system designs are described herein with regard to FIGS. 2A–2D.

Figure 2A:
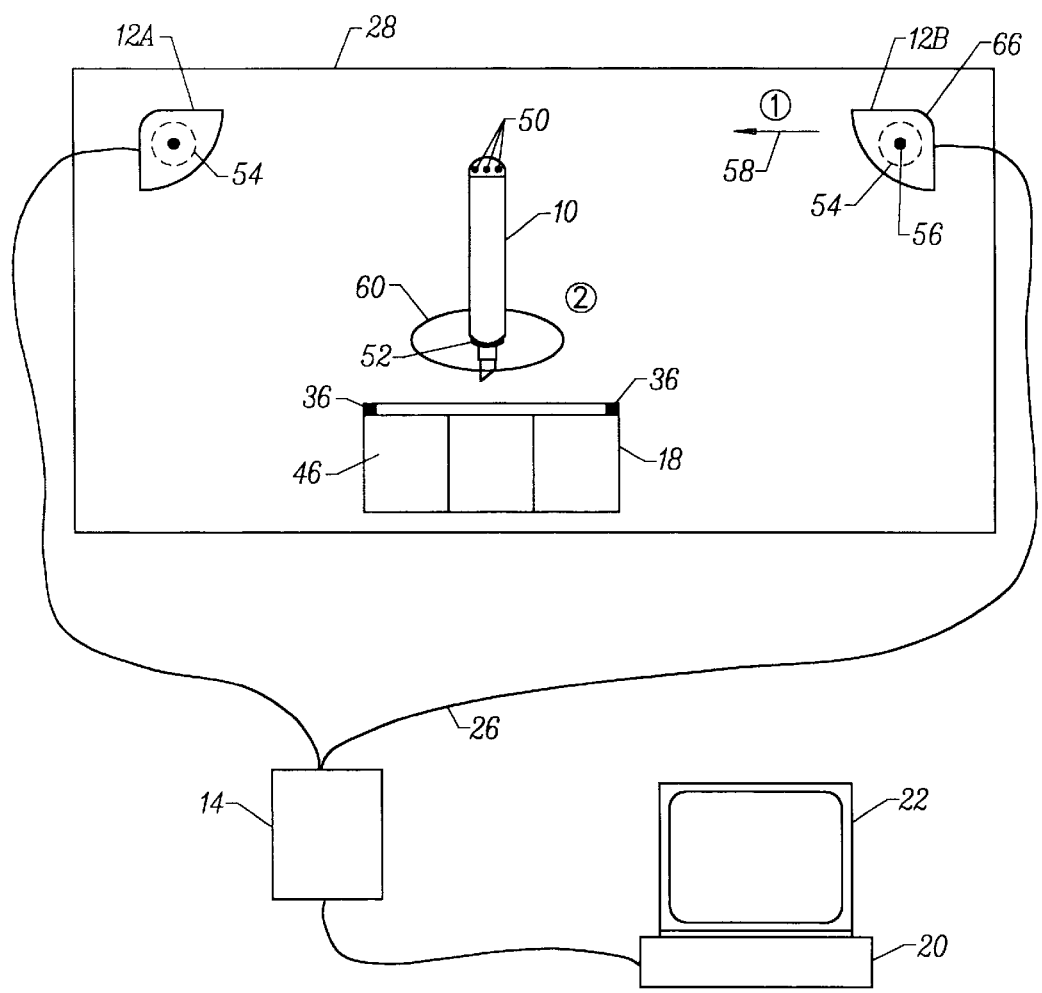
FIGS. 2A illustrates a transcription system where a stylus receives a reference signal and transmits a position signal.

FIG. 2A illustrates an embodiment where the stylus 10 includes at least one reference signal receiver 50 and a position signal transmitter 52. Meanwhile, the first detector 12A and the second detector 12B each include a position signal receiver 54. Located somewhere in the system is a reference signal transmitter 56. In FIG. 2A, the reference signal transmitter 56 is included in the second detector 12B. In other embodiments, the reference signal transmitter 56 can be included in the hardware unit 14.

As illustrated in FIG. 2A, a reference signal 58 is transmitted to the stylus 10 which instructs the stylus 10 to transmit a position signal 60. The position signal 60 is propagated radially from the stylus 10 and received by the first detector 12A and the second detector 12B at a time that is dependent on the distance between the stylus 10 and each of the first detector 12A and the second detector 12B at the time that the position signal 60 is produced. Since the position signal 60 is transmitted at a known time after the reference signal 58 is transmitted, the time of flight of the position signal 60 to each detector can be determined.

The hardware unit 14 receives position signals 60 from each detector and controls the transmission of the reference signals 58 from the reference signal transmitter 56. The hardware unit 14 uses the received position signals 60 to determine the time of flight of the position signal 60 from the stylus 10 to the first detector 12A and the second detector 12B. The time of flight is received by the processing unit 20 which includes logic for using the time of flight data to determine the position of the stylus 10 relative to the first detector 12A and the second detector 12B. The logic may employ a variety of methodologies for determining the position of the stylus 10 including, for example, triangulation or a look-up table containing different positions associated with different times of flight to each detector.

A variety of reference signals 58 may be used. In general, the reference signal 58 should be at least as fast as the position signal 60 and is preferably significantly faster than the position signal 60. When the reference signal 58 is significantly faster than the position signal 60 (e.g., speed of light vs. speed of sound), it is possible to disregard the time of flight of the reference signal 58 when determining the time of flight of the position signal 60. In one embodiment, the reference signal 58 travels at the speed of sound and in another travels at the speed of light. In a particular embodiment, the reference signal 58 is a form of electromagnetic radiation, such as infra-red (IR) light.

A variety of position signals 60 may be used. In one embodiment, the position signal 60 is ultrasound. In another embodiment, the position signal 60 is a form of electromagnetic radiation, such as radar, preferably micro-impulse radar.

Figure 2B:
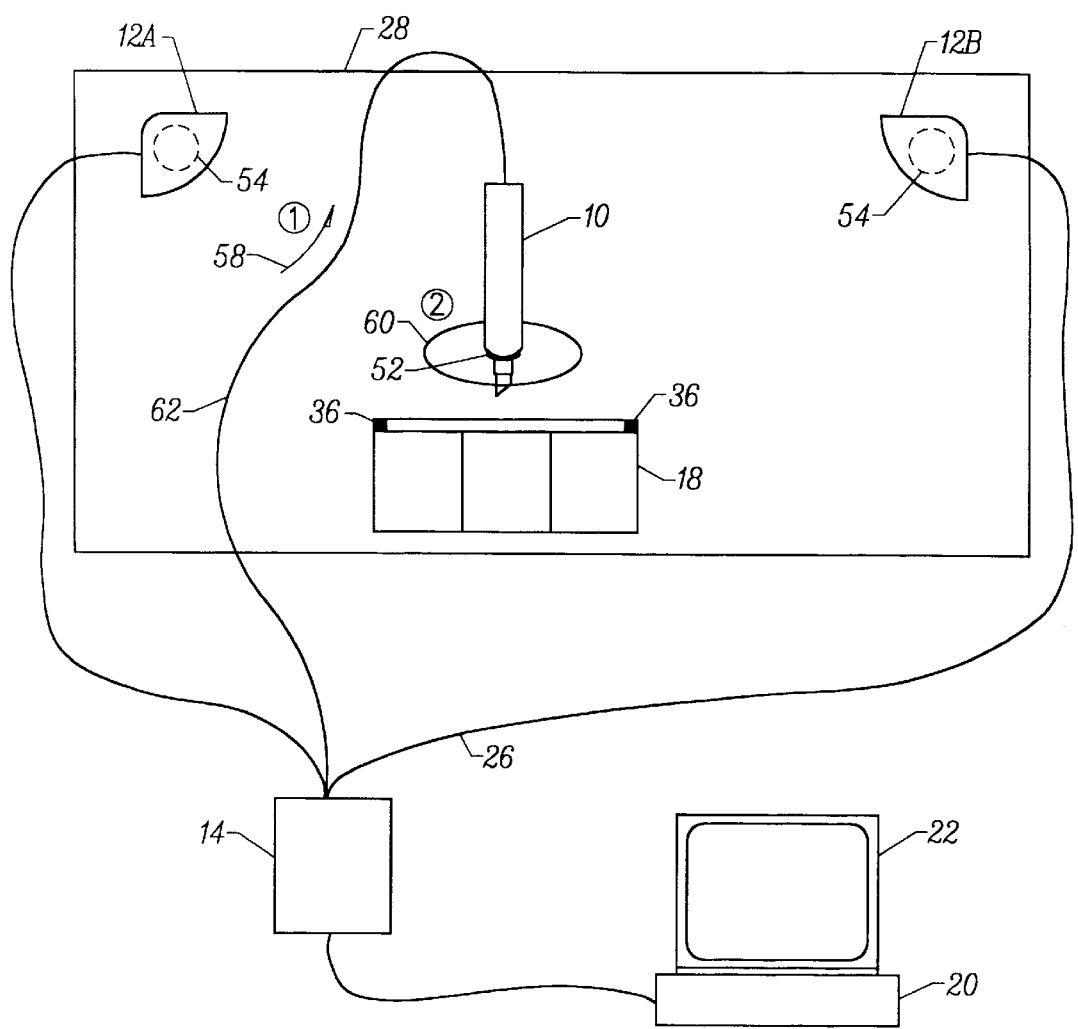
FIG. 2B illustrates a transcription system where a stylus receives a reference signal via an electrical wire.

FIG. 2B illustrates an alternative embodiment where the stylus 10 includes a position signal transmitter 52 and is physically attached to the hardware unit 14 by a wire 62. Meanwhile, the first detector 12A and the second detector 12B each include a position signal receiver 54.

As illustrated in FIG. 2B, a reference signal 58 is transmitted to the stylus 10 from the hardware unit 14 via the wire 62. When the reference signal 58 is received, the stylus 10 transmits a position signal 60 which propagates radially from the stylus 10 and is received by the first detector 12A and the second detector 12B at a time that is dependent on the distance between the stylus 10 and the first detector 12A and the second detector 12B at the time that the position signal 60 is produced. Since the position signal 60 is transmitted at a known time after the reference signal 58 is transmitted, the time of flight of the position signal 60 to each detector can be determined.

Figure 2C:
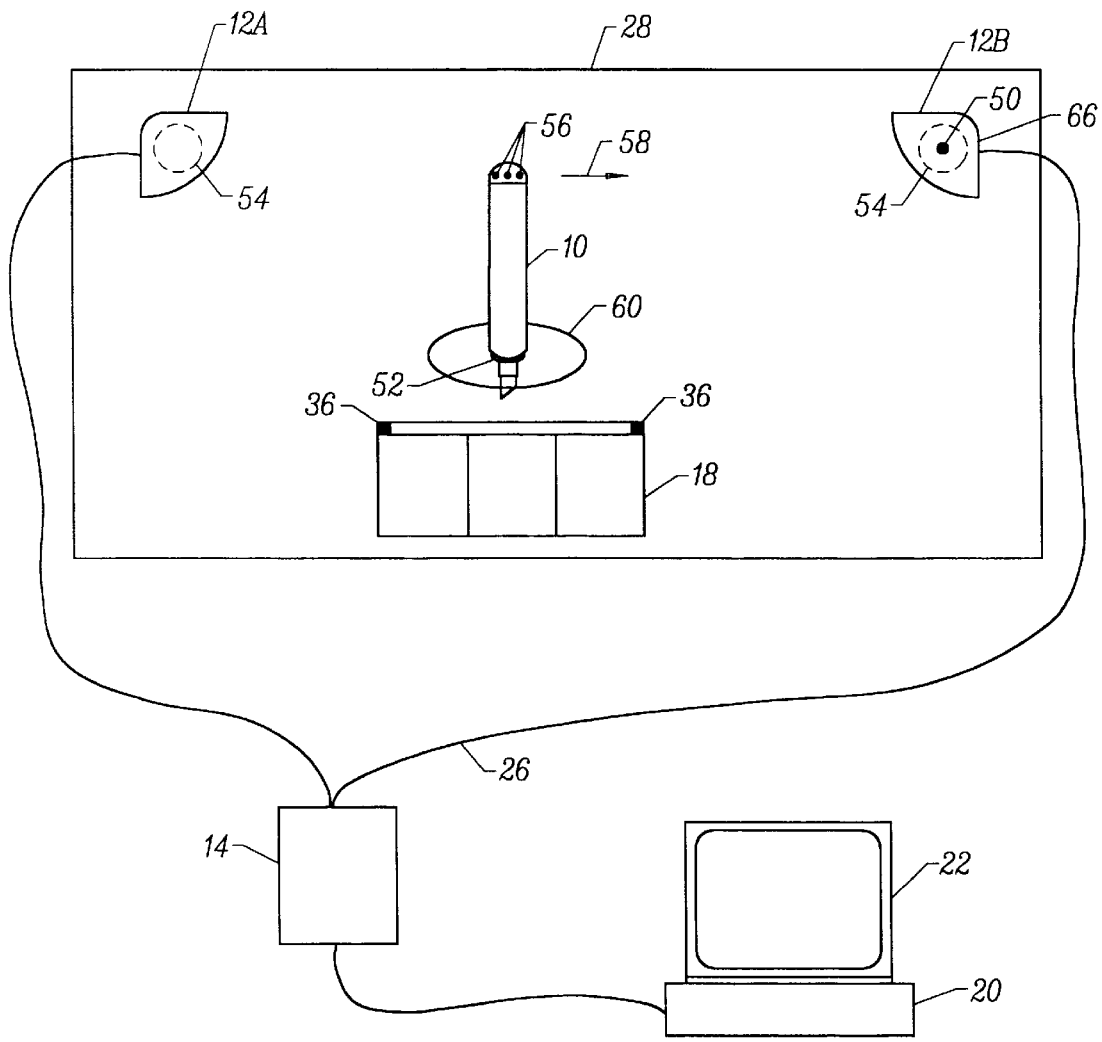
FIG. 2C illustrates a transcription system where a stylus transmits a position signal and a reference signal.

FIG. 2C illustrates an alternative embodiment where the stylus 10 includes a position signal transmitter 52 and the first detector 12A and the second detector 12B each include position signal receivers 54. The stylus 10 also includes a reference signal transmitter 56 and the second detector 12B, called the reference detector 66, includes a reference signal receiver 50 in addition to the position signal receiver 54.

As illustrated in FIG. 2C, a reference signal 58 is transmitted by the stylus 10 to the reference detector 66 to signal that a position signal 60 is being transmitted or is about to be transmitted. After the reference signal 58 is transmitted, a position signal 60 is transmitted which is received by the first detector 12A and the second detector 12B. Since the position signal 60 is transmitted at a known time after the reference signal 58 is transmitted, the time of flight of the position signal 60 to each detector can be determined by the processing unit 20.

In the embodiment of FIG. 2C, the reference signal 58 and the position signal 60 can be transmitted together for each point in the monitor image 44. However, the position signal 60 can also be transmitted without the reference signal 58. For instance, the reference signal 58 can serve to synchronize the stylus 10 and the hardware housing and/or the processing unit 20. When the reference signal 58 serves as a synchronizing signal, the stylus 10 is configured to transmit a series of position signals 60 at a known time interval. The reference signal 58 indicates when the first position signal 60 in the series is transmitted. The processing unit 20 includes a timer which is started after receiving the reference signal 58. The first time of flight determination for a particular detector is made by measuring the time between starting the timer and receiving the position signal 60 at the particular detector. Since subsequent position signals 60 are transmitted at known intervals, the hardware housing and/or the processing unit 20 can include logic for determining when each subsequent position signal 60 is transmitted. As a result, the time of flight to a particular detector can be calculated by determining the time between when the position signal 60 is transmitted and when the position signal 60 is received at that detector.

Figure 2D:
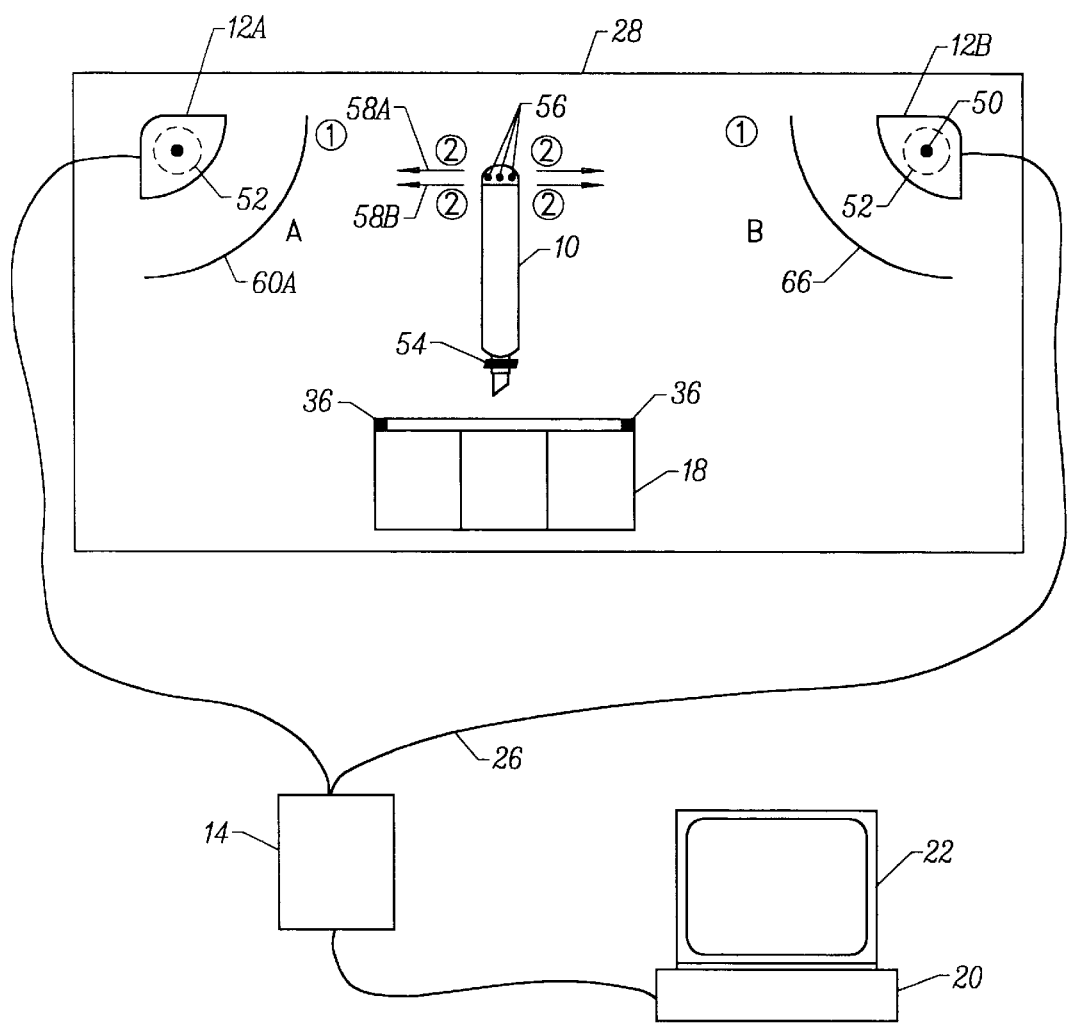
FIG. 2D illustrates a transcription system where a stylus transmits two different reference signals in response to receiving different position signals.

FIG. 2D illustrates yet an alternative embodiment where the stylus 10 includes a position signal receiver 54 and a reference signal transmitter 56. The first detector 12A and the second detector 12B include position signal transmitters 52 and reference signal receivers 50. It is noted that this embodiment can be readily varied where the stylus 10 includes a reference signal receiver 50 and one or both of the first detector 12A and the second detector 12B include a reference signal transmitter 56.

As illustrated in FIG. 2D, each detector transmits a different position signal 60 which can be distinguished by the position signal receiver(s) 54 on the stylus 10. When the stylus 10 receives one or more of the position signals 60, the stylus 10 transmits a reference signal 58 to confirm receipt of the position signal 60 and request that the next position signals 60 be sent.

Figure 3A:
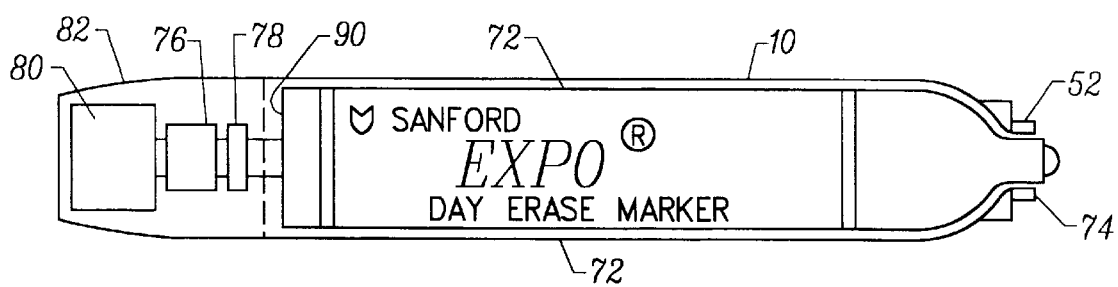
FIG. 3A is a sideview of a stylus for use with the present invention.

FIG. 3A illustrates an embodiment of a stylus 10 which can be used with the system illustrated in FIG. 2A. As illustrated, the stylus 10 includes a stylus housing 70 and a writing element 72. Suitable writing elements 72 include, but are not limited to, an inkwell, chalk, pencil, pencil lead, pen and a marker such as a SANFORD EXPO. The stylus housing 70 includes a tip end 74 with a position signal transmitter 52. The stylus housing 70 also includes a power source 76, a contact switch 78 and an electronics housing 80 and a plurality of reference signal receivers 50.

As illustrated in FIG. 3B, the stylus housing 70 may be designed such that the writing element 72 is removable from the stylus housing 70. As illustrated in FIG. 3B, the stylus housing 70 may include a cap 82 and a sleeve 84 which may be attached and detached from each other, the sleeve 84 including a volume 86 within which the writing element 72 may be positioned, the cap 82 serving to maintain the writing element 72 within the sleeve 84. By enabling the writing element 72 to be removed, the writing element 72 can be replaced when writing media contained in the element is exhausted or a different writing media (type or color) is desired. When the writing instrument is replaced, the tip 88 of the replacement writing instrument is inserted through the stylus housing 70 and into the tip end 74 of the stylus 10. The cap 82 is placed on the stylus 10 so the rear 90 of the writing instrument is in contact with the contact switch 78.

The contact switch 78 can be used to indicate when the stylus 10 is being used to write. The contact switch 78 typically works based on pressure being exerted between the stylus 10 and a writing surface 28. In operation, the stylus 10 is held such that the tip 88 of the writing instrument is contacted with the writing surface 28. The pressure of the writing instrument on the writing surface 28 closes the contact switch 78 and activates a circuit within the electronics housing 80.

When the circuit within the stylus housing 70 is activated, an activation signal is provided to the system to indicate that the stylus 10 has been contacted with the writing surface 28. The propagation of reference and position signals 60 can be initiated in response to the activation signal. The activation signal may be a position signal 60 or a reference signal 58 transmitted from the stylus 10. Similarly, when the electronics housing 80 is deactivated by lifting the stylus 10 off the writing surface 28, a deactivation signal may be transmitted to the system. The system can also detect when the electronics housing 80 has been deactivated by detecting that a position signal, or reference signal 58, has not been transmitted from the stylus 10 for some predetermined period of time.

As also illustrated in FIG. 3A, the stylus 10 includes reference signal receivers 50. These receivers are preferably evenly spaced around the stylus 10 so that reference signals 58 can be received from any angle relative to the stylus 10. In a preferred embodiment, the reference signal receiver 50 is an IR signal receiver. Suitable IR receivers include, but are not limited to photodiodes.

As also illustrated in FIG. 3A, the stylus 10 includes a position signal transmitter 52. In one embodiment, the position signal transmitter 52 is an ultrasound transmitter. Suitable ultrasound transmitters include, but are not limited to, Polaroid L Series ultrasonic emitters, cylindrical polyvinylidene fluoride (PVDF) rings and similar piezotransducing elements. Suitable position signals 60 include, but are not limited to, a 40 kHz signal emitted for approximately 0.7 ms.

Figure 3C:
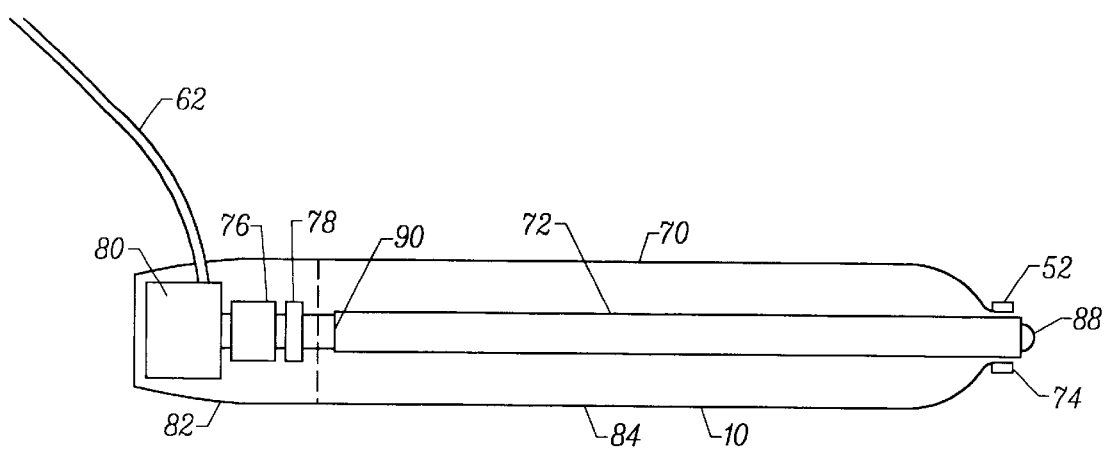
FIG. 3C is a sideview of a stylus coupled with an electrical wire for providing a reference signal to the stylus.

FIG. 3C illustrates an embodiment of the stylus 10 which can be used with the transcription system illustrated in FIG. 2B. The electronics housing 80 is coupled to the system via the electrical wire 62. As a result, the reference signal 58 can be transmitted to the stylus 10 via the wire 62. The position signal 60 is transmitted from the position signal transmitter 52 in response to receiving the reference signal 58.

The stylus 10 can also be adapted to be used in a transcription system such as the one illustrated in FIG. 2C. For example, the stylus 10 can include a reference signal transmitter 56 and a position signal transmitter 52. The detectors 12A, 12B can be modified to include a reference signal receiver 50 and a position signal receiver 54.

The stylus 10 can also be adapted to be used in a transcription system such as the one illustrated in FIG. 2D. For example, the stylus 10 can include a reference signal transmitter 56 and a position signal receiver 54. The detectors 12A, 12B can be modified to include a position signal transmitter 52. A reference signal receiver 50 is also provided in the system and may optionally be incorporated into one of the detectors 12A, 12B.

Figure 4A:
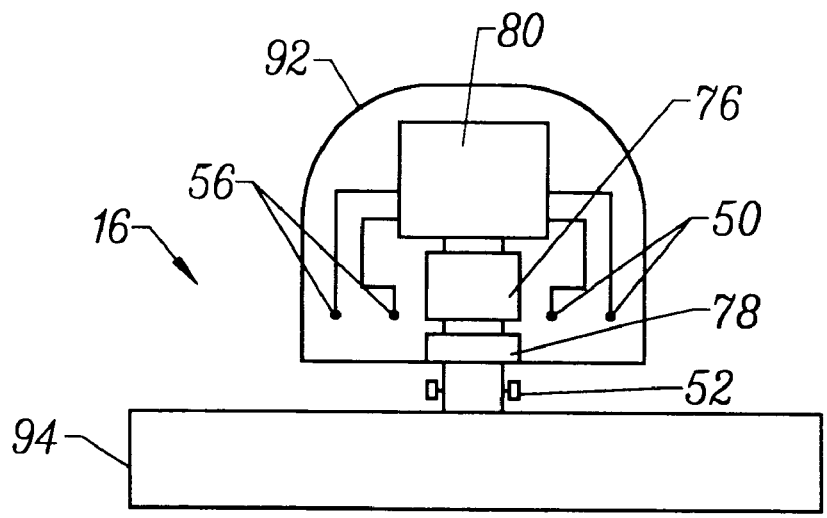
FIG. 4A is a sideview of an eraser for use with the transcription system.

FIG. 4A illustrates an eraser 16 which may be used in a system according to the present invention. The eraser 16 illustrated includes a holding surface 92, an eraser pad 94, a position signal transmitter 52, a reference signal receiver 50, a contact switch 78 and an electronics housing 80. It is noted that this eraser 16 is designed for use in a transcription system such as the one illustrated in FIG. 2A. However, the eraser 16 can be modified, as described above with regard to the stylus 10, for use with different transcription systems.

In operation, the eraser 16 is positioned such that the eraser pad 94 is pushed against the writing surface 28. The eraser pad 94 is constructed form a material which erases the writing element 72 media on the writing surface 28. For instance, when the writing element 72 is a white board marker, the eraser pad 94 can be a typical white board eraser material. As a result, contact between the eraser pad 94 and the writing surface 28 can serve to erase a portion of the writing image from the writing area 32.

The pressure of the eraser pad 94 on the writing surface 28 drives the eraser pad 94 against the contact switch 78, closing the contact switch 78 and activating a circuit within the electronics housing 80. Activating the circuit within the electronics housing 80 can serve to signal the eraser 16's operation to the hardware unit 14 and/or the processing unit 20 in a similar manner as discussed with respect to the stylus 10.

When the circuit within the electronics housing 80 is activated, a reference signal 58 received at one of the reference signal receivers 50 triggers a position signal 60 to be transmitted from the position signal transmitter 52. The reference signal receivers 50 are preferably evenly spaced around the eraser 16 so a reference signal 58 can be received from different angles around the eraser 16. The reference signal receivers 50 and the position signal transmitter 52 can be similar to the reference signal receivers 50 and the position signal transmitter 52 used in the stylus 10.

The signal transmitted by the position signal transmitter 52 on the eraser 16 can optionally be different from the signal transmitted by the position signal transmitter 52 on the stylus 10. The hardware unit 14 and/or the processing unit 20 can then distinguish that the signal being received is from the eraser 16 as opposed to the stylus 10. When the transcription system detects that it is receiving signals from the eraser 16, the transcription system can erase the monitor image 44 according to the position of the eraser 16 on the writing surface 28.

Figure 4B:
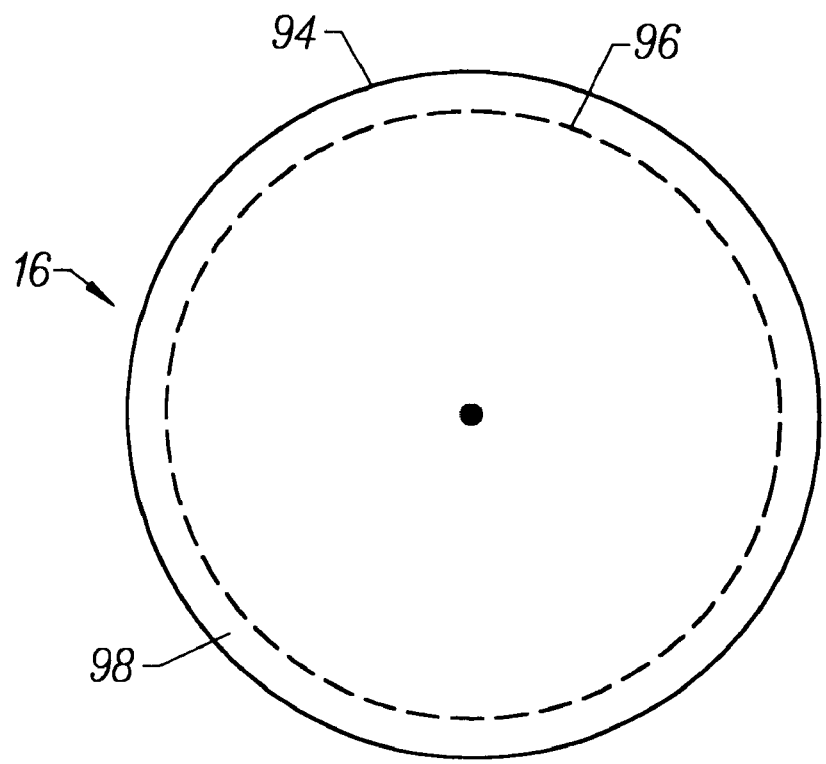
FIG. 4B is a bottom view of the eraser of FIG. 4A.

The processing unit 20 will detect the position of the position signal transmitter 52 as illustrated in FIG. 4B. However, the portion of the written image 42 which is erased is the portion of the written image 42 in contact with any portion of the eraser pad 94 and not simply the position of the position signal transmitter 52. Accordingly, the processing unit 20 includes logic which accounts for the portion of the written image 42 actually contacted by the eraser pad 94. The processing unit 20 calculates an approximate eraser area 96 which matches the eraser pad footprint 98. As the eraser 16 is moved about the writing surface 28, the portion of the monitor image 44 which falls within the approximate eraser area 96 is erased from the monitor image 44. The size of the approximate eraser area 96 can be adjusted so it matches the actual size of the eraser pad footprint 98. Similarly, the approximate eraser area 96 can be calculated to have different shapes which match the shape of the eraser pad footprint 98.

FIG. 5A illustrates an embodiment of the reference detector 66 which may be used with the transcription system illustrated in FIG. 2A. The reference detector 66 includes a detector housing 100, a position signal receiver 54 and a reference signal transmitter 56. The reference signal transmitter 56 is preferably positioned in an upper surface 102 of the detector housing 100. An example of an ultrasound receiver that may be used is the Polaroid L Series Ultrasonic Receiver. An example of a reference signal transmitter 56 that may be used is an IR transmitter. The position signal receiver 54 may be coupled to the hardware unit 14 through a wire 62 connection (or a wireless connection) in order to communicate to the hardware unit 14 when position signals 60 are received by the reference detector 66. Meanwhile, the reference signal transmitter 56 is in electronic communication with the position signal receiver 54 (either directly or through the hardware unit 14) such that a signal is sent to the reference signal transmitter 56 to transmit a signal once certain position signals 60 are received by the position signal receiver 54.

As illustrated in FIG. 5B, a lower surface 108 the detector housing 100 includes one or more attachment mechanisms 110 for removably attaching the detector housing 100 to the writing surface 28. Examples of suitable attachments mechanisms include, but are not limited to, suction cups, magnets, VELCRO or a refreshable contact cement. It is also envisioned that mounting brackets may also be attached to the writing surface 28 which may obviate the need for an attachment mechanism.

The reference detector 66 may also be adapted for use with the transcription system of FIG. 2B, for example, by removing the reference signal transmitter 56 from the upper surface 102 of the detector housing 100.

The reference detector 66 may also be adapted for use with the transcription system of FIG. 2C by replacing the reference signal transmitter 56 with a reference signal receiver 50. Suitable reference signal receivers 50 include, but are not limited to, a photodiode.

The reference detector 66 may also be adapted for use with the transcription system of FIG. 2D by replacing the reference signal transmitter 56 with a reference signal receiver 50 and by replacing the position signal receiver 54 with a position signal transmitter 52.

Figure 6:
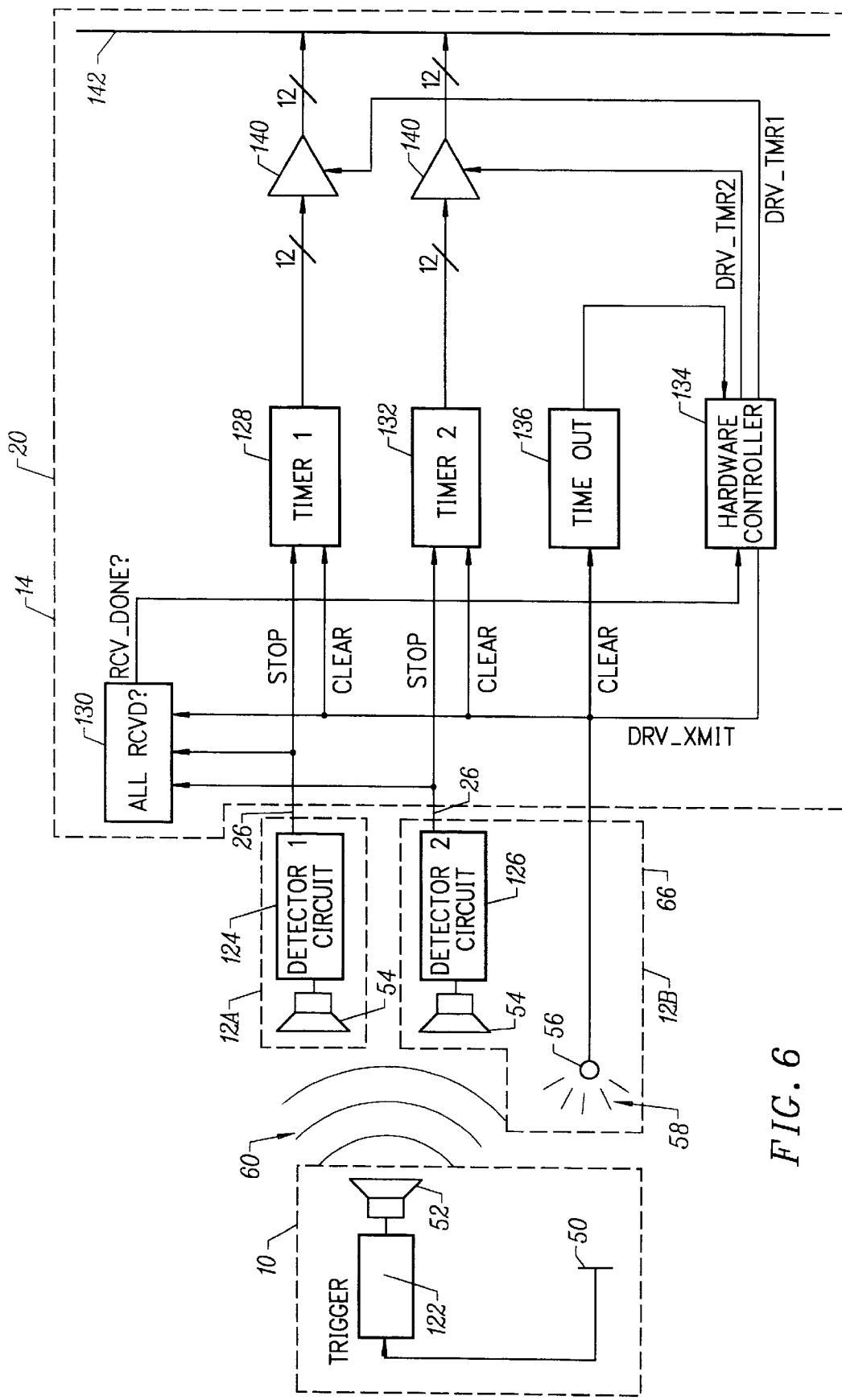
FIG. 6 is a circuit for use with the transcription system.

FIG. 6 illustrates a circuit diagram for controlling the transmission and emission of the various reference signals 58 and position signals 60 and for determining the time for a detector to receive a position signal 60. Various portions of the circuit 120 can be positioned in the stylus 10, the first detector 12A, the reference detector 66, the stylus 10 and the hardware unit 14 and/or the processing unit 20. For instance, the stylus 10 includes a reference signal receiver 50 coupled with a trigger circuit 122 which is coupled with a position signal transmitter 52. The trigger circuit 122 triggers the transmission of a position signal 60 in response to receiving a reference signal 58. The first detector 12A includes a position signal receiver 54 coupled with a first detector circuit 124. The reference detector 66 includes a reference signal transmitter 56, and a position signal receiver 54 coupled with a second detector circuit 126. The detector circuits provide a signal when the position signal receiver has received a position signal.

The output from the first detector circuit is received by a first timer 128 and a first toggle included in a processor 130. The output from the second detector circuit 126 is received by a second timer 132 and a second toggle included in the processor 130. The first timer 128, the second timer 132 and the processor 130 can be located within the hardware unit 14 and/or the processing unit 20.

The hardware unit 14 and/or the processing unit 20 includes a hardware controller 134. The hardware controller 134 periodically provides a DRV_XMIT signal on a DRV_XMIT line. The DRV_XMIT signal is received by the first timer 128, the second timer 132, a third toggle in the processor 130 and the reference signal transmitter 56 in the reference detector 66. The DRV_XMIT signal is also received by a timeout counter 136.

In operation, the hardware controller 134 provides a DRV_XMIT signal which causes the reference signal transmitter 56 to transmit a reference signal 58, resets the first and second timers and asserts a toggle within the processor 130. The reference signal receiver 50 receives the reference signal 58. The trigger circuit 122 triggers the position signal transmitter 52 to transmit a position signal 60. The position signal receiver 54 within the first detector 12A receives the position signal 60 and the first detector circuit provides a signal indicating that a position signal 60 has been received. The signal from the first detector circuit stops the first timer 128 and asserts the second toggle in the processor 130. The position signal receiver 54 in the reference detector 66 receives the position signal 60 and the second detector circuit 126 provides a signal indicating that a position signal 60 has been received. The signal from the second detector circuit 126 stops the second timer 132 and asserts the third toggle in the processor 130.

When the first second and third toggle are asserted, an RCV_DONE? signal is received by the hardware controller 134. The hardware controller 134 sequentially activates the amplifiers 140. The data from the first timer 128 is received on a bus 142 via the amplifiers 140. The data from the second timer 132 is received on the bus 142 via the amplifiers 140. After the data from the first timer 128 and the second timer 132 is received on the bus, the DRV_XMIT signal is provided again.

When the time out counter reaches some pre-determined limit, called the timeout, before all three toggles in the processor 130 are asserted, the DRV_XMIT signal is provided without the data on the first and second timers being received by the bus. The timeout limit is set to the amount of time for a position signal 60 to be transmitted across the diagonal dimension of the writing area 32. As a result, if one of the detectors 12A, 12B misses a position signal 60, the next cycle of position detection is performed.

The circuit 120 illustrated in FIG. 6 can be readily adapted for use with other transcription systems embodiments, such as the transcription system embodiments illustrated in FIGS. 2B–2D. For example, in order to adapt the circuit 120 for use with the transcription system illustrated in FIG. 2B, the reference signal transmitter 56 and the reference signal receiver 50 can be replaced with a wire for carrying the reference signal 58.

Figure 7:
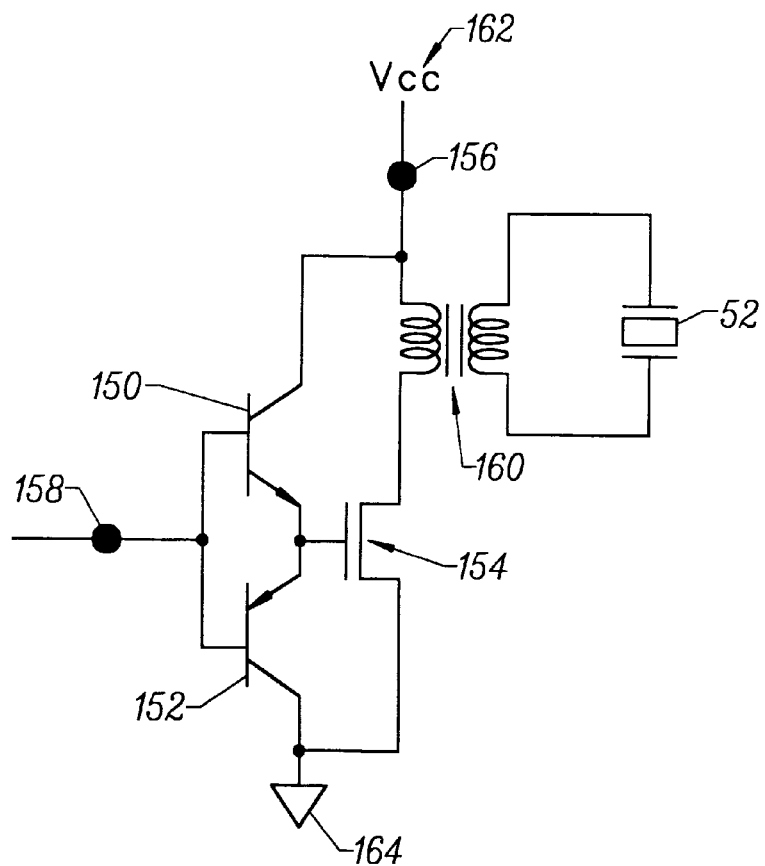
FIG. 7 is a circuit for use with the circuit of FIG. 6.

An example of a trigger circuit 122 that may be used in the transcription system is illustrated in FIG. 7. The trigger circuit 122 triggers the position signal transmitter 52 to transmit a position signal 60 in response to a reference signal receiver 50 receiving a reference signal 58. The circuit can be included in the stylus 10 or in the eraser 16. The trigger circuit 122 includes a first transistor 150, a second transistor 152, a third transistor 154, a first node 156, a second node 158 and a transformer 160. A power source 162 is coupled with the first node 156. Suitable power sources 162 include, but are not limited to, a battery such as a 4.5 V battery. The first node is coupled with the collector of the first transistor. Suitable first transistors include, but are not limited to, an NPN Bipolar Junction Transistor. The emitter of the first transistor is coupled with the emitter of the second transistor and also with the base of the third transistor. Suitable second transistors include, but are not limited to, PNP Bipolar Junction Transistors. Suitable third transistors include, but are not limited to, an NMOS transistor. The collector of the second transistor is coupled with a ground 164.

An IR detector can be coupled with the second node via an amplifier (not shown). The second node is coupled with the base of the first and second transistor.

The first node is also coupled with the transformer. A suitable transformer transforms a 4.5 V signal to a 225 V signal. The transformer is coupled with the source of the third transistor. The drain of the third transistor is coupled with the ground. The transformer is coupled with the ultrasound transducer. When the potential at the second node exceeds a threshold potential, current flows from the power source 162 to the ground drives the ultrasound transducer. As a result, the ultrasound position signal 60 is triggered by the IR reference signal 58.

The second node can also be coupled with the hardware housing as illustrated in FIG. 2B. As a result, the ultrasound position signal 60 is triggered by a reference signal 58 received via the electrical wire 62.

Figure 8:
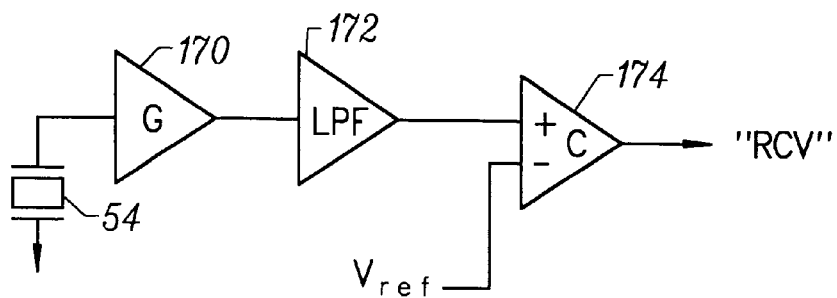
FIG. 8 is a circuit for use with the circuit of FIG. 6.

FIG. 8 illustrates a detector circuit which may be used in the circuit 120 illustrated in FIG. 6. The detector circuit is typically housed within the detector but may be positioned in another location within the system. The circuit 120 includes an amplifier 170, a low pass filter 172 and a comparator 174. The position signal transmitter 52 is coupled with the amplifier. The amplifier is coupled with the low pass filter. The low pass filter is coupled with the comparator. As a result, when the signal from the low pass filter rises above some threshold value a signal is provided from the comparator to indicate that the position signal 60 has been detected.

Figure 9:
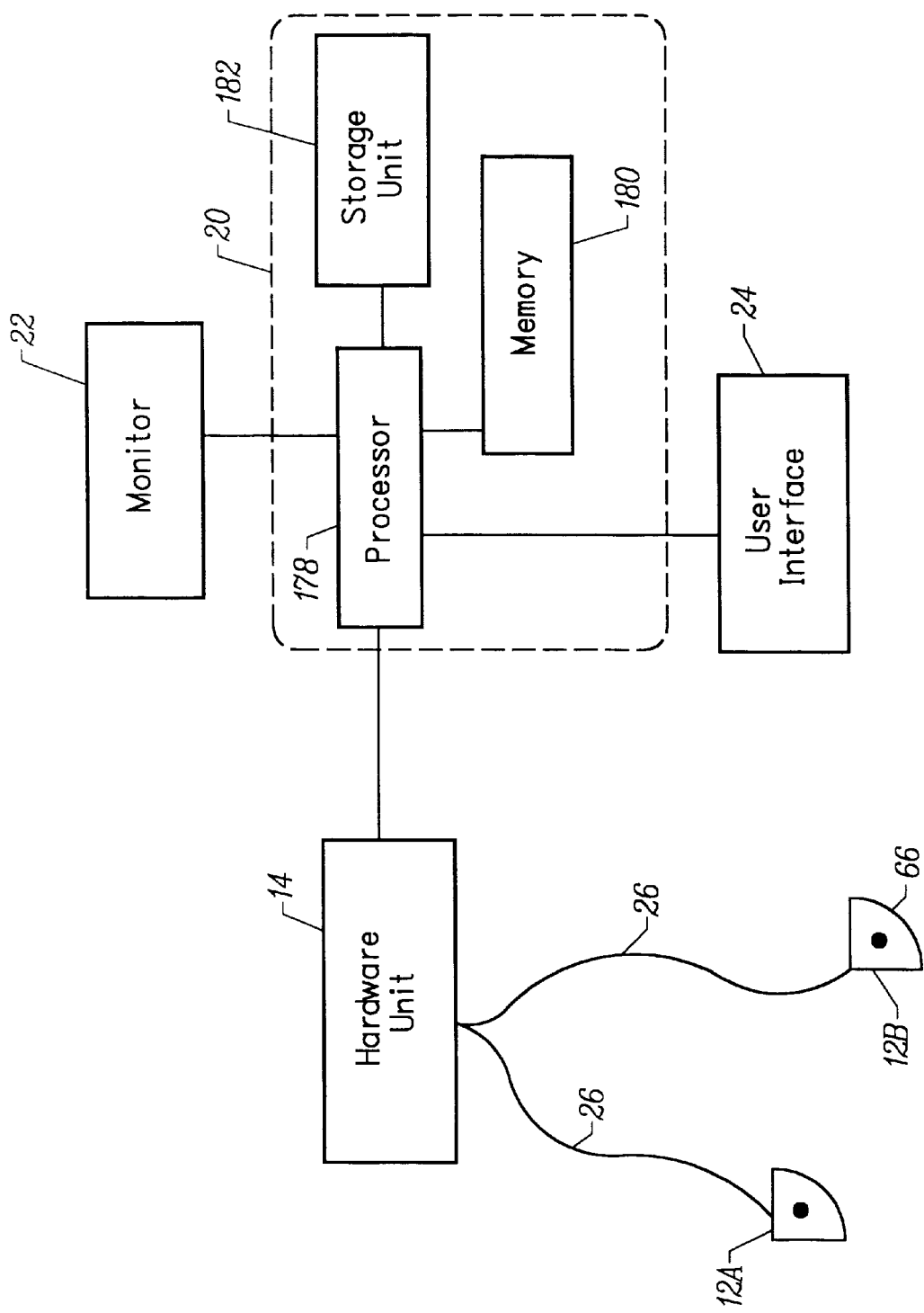
FIG. 9 is a block diagram of a processing unit.

FIG. 9 provides a schematic of an embodiment of a processing unit 20. The processing unit 20 illustrated includes a processor 178 in communication with a volatile memory 180, and a storage unit 182. The processor 178 is also in communication with the bus illustrated in FIG. 6 via a serial port. Suitable processors 178 include, but are not limited to, microprocessors and CPUs. The storage until can include program code and various data tables. The volatile memory 180 is utilized during execution of the program code included in the storage unit 182. The program code can include a calibration module, an image creation module, an image erase module and a system management module. The program code can also optionally include handwriting recognition software for converting the monitor image 44 directly into ASCII text or converted directly into presentation software such as Microsoft Power Point.

The calibration module guides the user in calibrating the system and calculates the dimensions of the writing area 32. The calibration module may be accessed when the user installs the transcription system and can be accessed at the command of the user when the user feels the system may have become uncalibrated. During the calibration module, the distance between the first detector 12A and the second detector 12B, W, is determined and the Height of the writing area, H, is determined. The calibration module also determines the time for a position signal 60 to travel across a diagonal of the writing surface 28. This time is called the timeout limit.

The image creation module can be accessed after the calibration module. The image creation module creates the monitor image 44 as the written image 42 is being created. The image creation module also stores the monitor image 44 as the written image 42 is being created.

Figure 10:
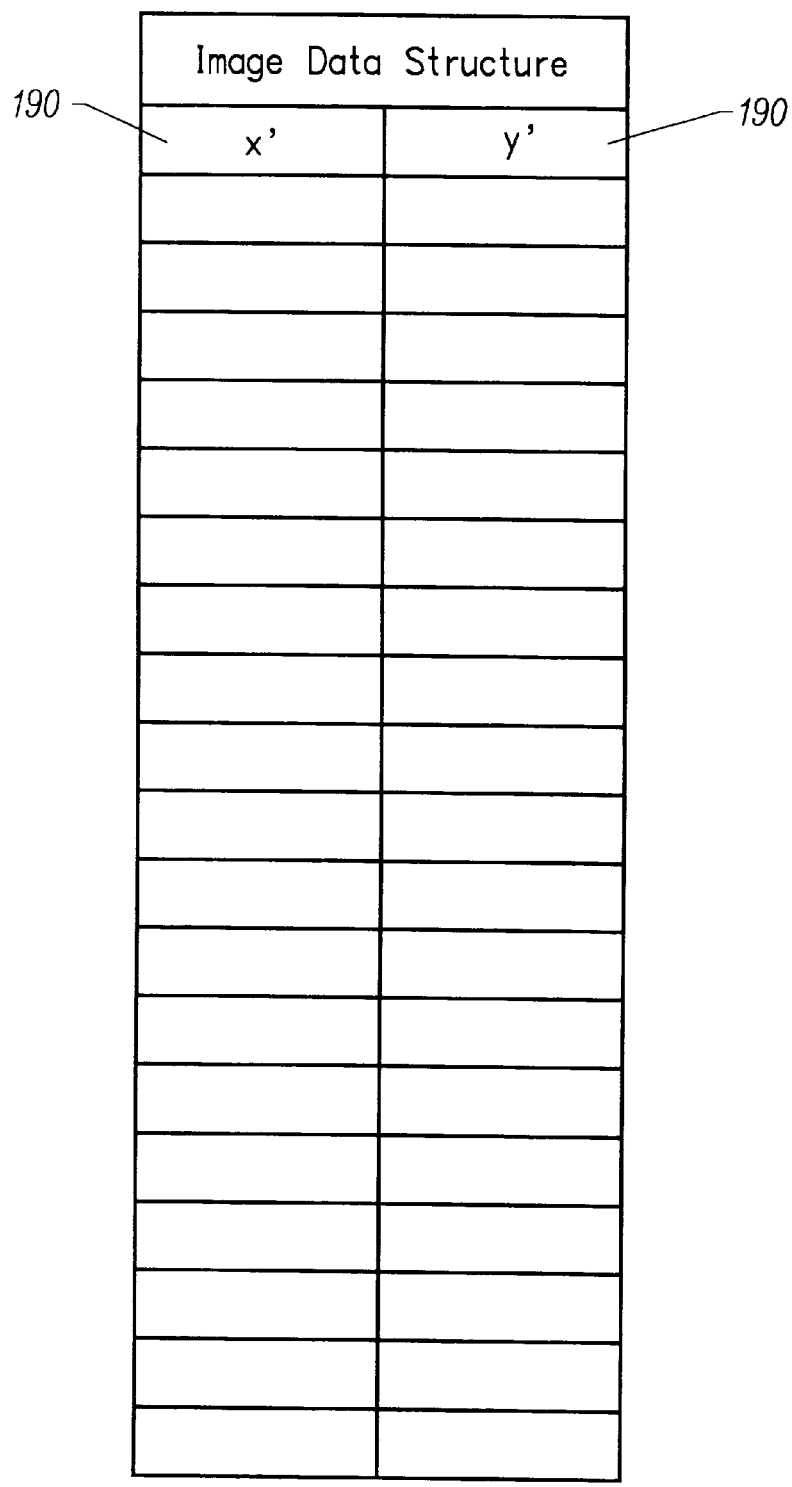
FIG. 10 illustrates the data structure for an image table.

FIG. 10 illustrates a data structure for an image table which can be stored in the storage device. The image table includes a column of x' fields 190 correlated with a y' 190 fields. Each pair of correlated x' fields and y' fields lists the normalized Cartesian coordinates for a position of the stylus 10 on the writing area. The monitor image 44 can be created by forming lines between sequential positions in the image table to form a figure. Certain rows can include entries which indicate that the stylus 10 was removed from the writing surface 28. These entries are created when an activation or deactivation signal has been received as discussed above. When such an entry exists, lines are drawn between the series of positions following the entry but not between positions on opposite sides of the entries. As a result, a second figure is created which is independent of the first figure.

Figure 11:
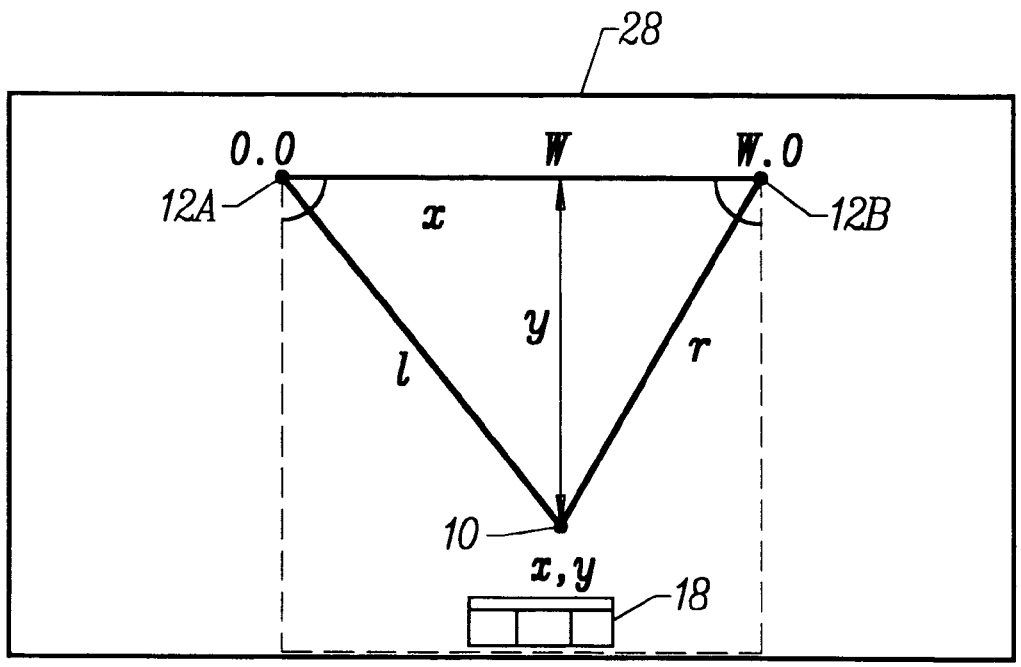
FIG. 11 illustrates the relationship between the position of the detectors on the writing surface and the position of the stylus on the writing surface.

The normalized Cartesian coordinates can be calculated by determining the position of the stylus 10 relative to the first detector 12A and the second detector 12B. FIG. 11 illustrates the relationship between the detector positions, (0, 0) and (W, 0), and the stylus 10 position (x, y). In Equation 1 and Equation 2, the dimension W is the width between the first detector 12A and the second detector 12B. W is determined during the calibration module along with the height of the writing area, H.

As illustrated, the detector in the upper left corner of the writing area 32 is presumed to be positioned at the origin, (0,0) in Cartesian coordinates. As a result, the detector in the upper right corner is presumed positioned at (W, 0). The distances r and 1 can be calculated by multiplying the time for the position signal 60 to travel between the detectors 12A, 12B and the stylus 10 by the speed of sound. At standard temperature and pressure, the speed of sound is about 1088 ft/s (31.7 mi/s). When W, r and 1 are known, the position of the stylus 10 on the writing area 32 can be determined by calculating (x, y). The normalized Cartesian coordinates (x', y') of the stylus 10 can then be determined by dividing x by W and dividing y by H.

Figure 12:
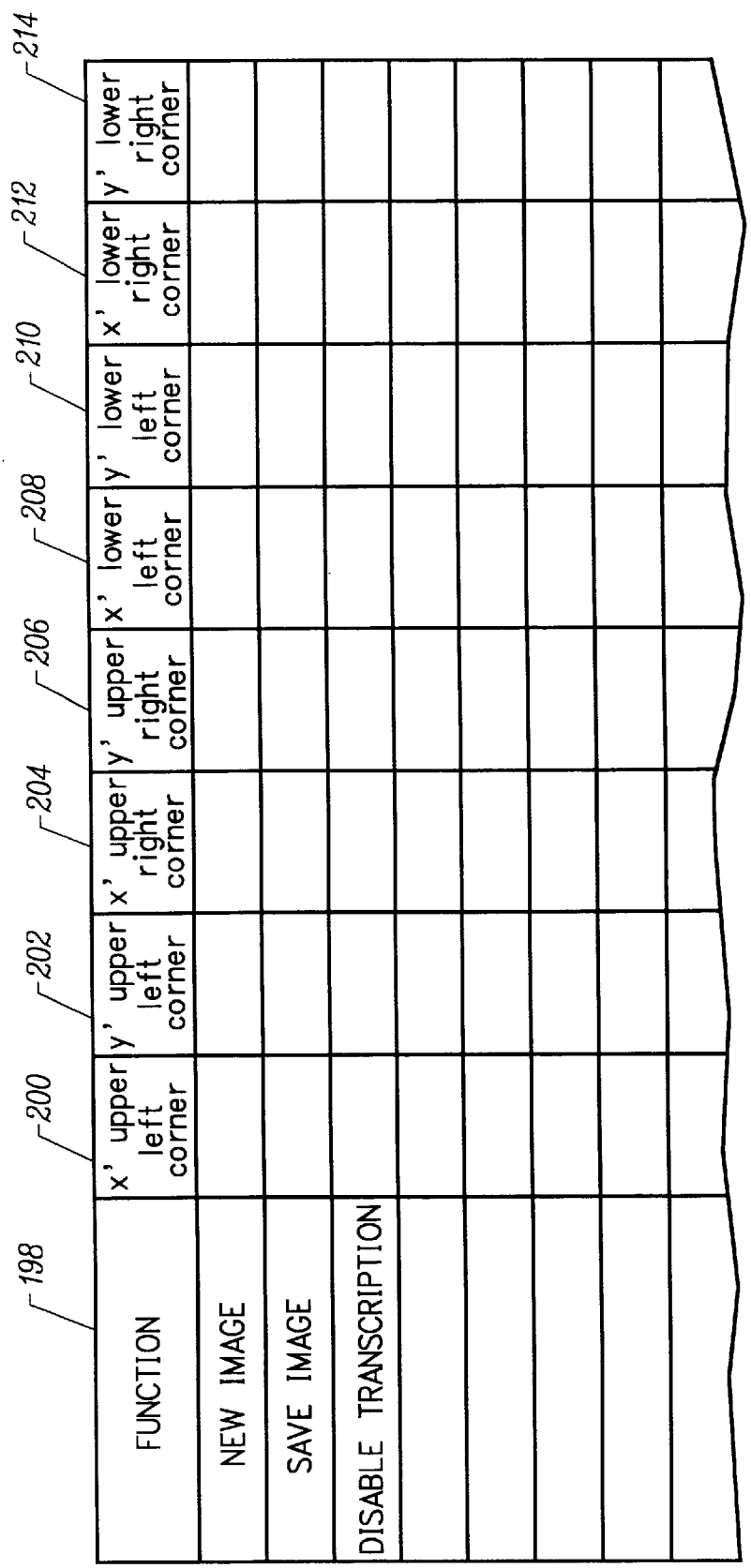
FIG. 12 illustrates a data structure for an input section table.

FIG. 12 illustrates a data structure for an input section table which can be stored in the storage unit 182. The input section table includes a function field 198, an x' upper left corner field 200, a y' upper left corner field 202, an x' upper right corner field 204, a y' upper right corner field 206, an x' lower left corner field 208, a y' lower left corner field 210, an x' lower right corner field 212 and a y' lower right corner field 214. The function field 198 lists the function that the computer will perform when the stylus 10 is positioned within a particular input section 46 of the calibration pad 18. The x' upper left corner field 200 and the y' upper left corner field 202 lists the normalized Cartesian coordinates of the upper left corner of the input section 46 that will perform the function listed in the function field 198. Similarly, the remaining fields list the normalized Cartesian coordinates for each corner of the input section 46 which will perform the listed function. As a result, the input section table lists coordinates which define the position of each input section 46 on the calibration pad 18.

Figure 13:
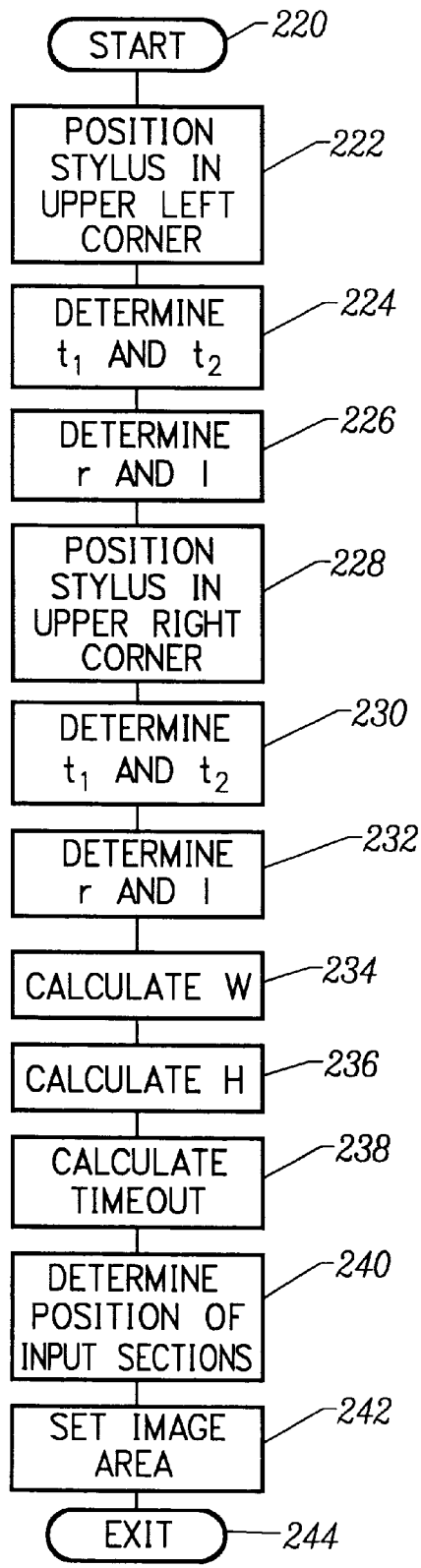
FIG. 13 is a process flow for a calibration module.

The process flow of the calibration module is illustrated in FIG. 13. Control is passed from the start block 220 to process block 222. At process block 222 the user is directed to touch the stylus 10 to the upper left corner of the calibration pad 18. The direction takes the form of creating a calibration pad image 38 on the monitor 22 and showing a stylus 10 contacting the upper left corner of the calibration pad 18 as discusses with respect to FIG. 1C. Control is then passed to process block 224 where the time for the position signal 60 to pass from the stylus 10 to the first detector 12A and the second detector 12B, $t_1$ and $t_2$, is accessed from the bus. Control is then passed to process block 226 where the r and 1 of Equation 1 and Equation 2 are calculated by multiplying $t_1$ and $t_2$ by the speed of sound. The calculated r and 1 are stored as r, and $1_1$. Control is then passed to process block 228 where the user is directed to touch the stylus 10 to the upper right corner of the calibration pad 18. Control is then passed to process block 230 where the time for the position signal 60 to pass from the stylus 10 to the first detector 12A and the second detector 12B, $t_1$ and $t_2$, is accessed from the bus. Control is then passed to process block 232 where the r and 1 are calculated by multiplying $t_1$ and $t_2$ by the speed of sound. The calculated r and 1 are then stored as $r_2$ and $1_2$.

Control is passed from process block 232 to process block 234. At process block 234, the stored dimensions $r_1$, $1_1$, $r_2$, $1_2$ are used with the known width of the calibration pad 18 to solve several linear equations to determine W. W is then stored for later use. Control is then passed to process block 236 where W and is used to determine the height of the detectors 12A, 12B above the calibration pad 18, h. The height of the writing area, H, is then determined by adding the height of the calibration pad 18 and h. H is then stored for later use. Control is then passed to process block 238 where H and W are used to calculate the diagonal length of the writing area 32. The time for a position signal 60 to travel that diagonal is determined by dividing the length of the diagonal by the speed of sound. The determined time is stored as the timeout limit.

Control is then passed to process block 240 where the position of each of the input sections 46 on the calibration pad 18 are determined. W, $r_1$, and $1_1$ are used in Equation 1 and Equation 2 of FIG. 11 to determine the position of the upper left corner of the calibration pad 18. There is a known relation between the position of the upper left corner of the calibration pad 18 and the position of each corner of the input sections 46. This relation is used to determine the Cartesian coordinates of each corner of the input sections 46. These coordinates are then normalized and stored in the appropriate fields of the input section table.

Control is passed from process block 240 to process block 242. The ratio of W:H is then calculated and used to define an monitor image area 243 as illustrated in FIG. 1D. The monitor image area is the position on the monitor 22 where the monitor image 44 will be formed. The ratio of the length and width of the monitor image area is equal to the ration of W:H. Control is then passed to the exit block 244.

Figure 14:
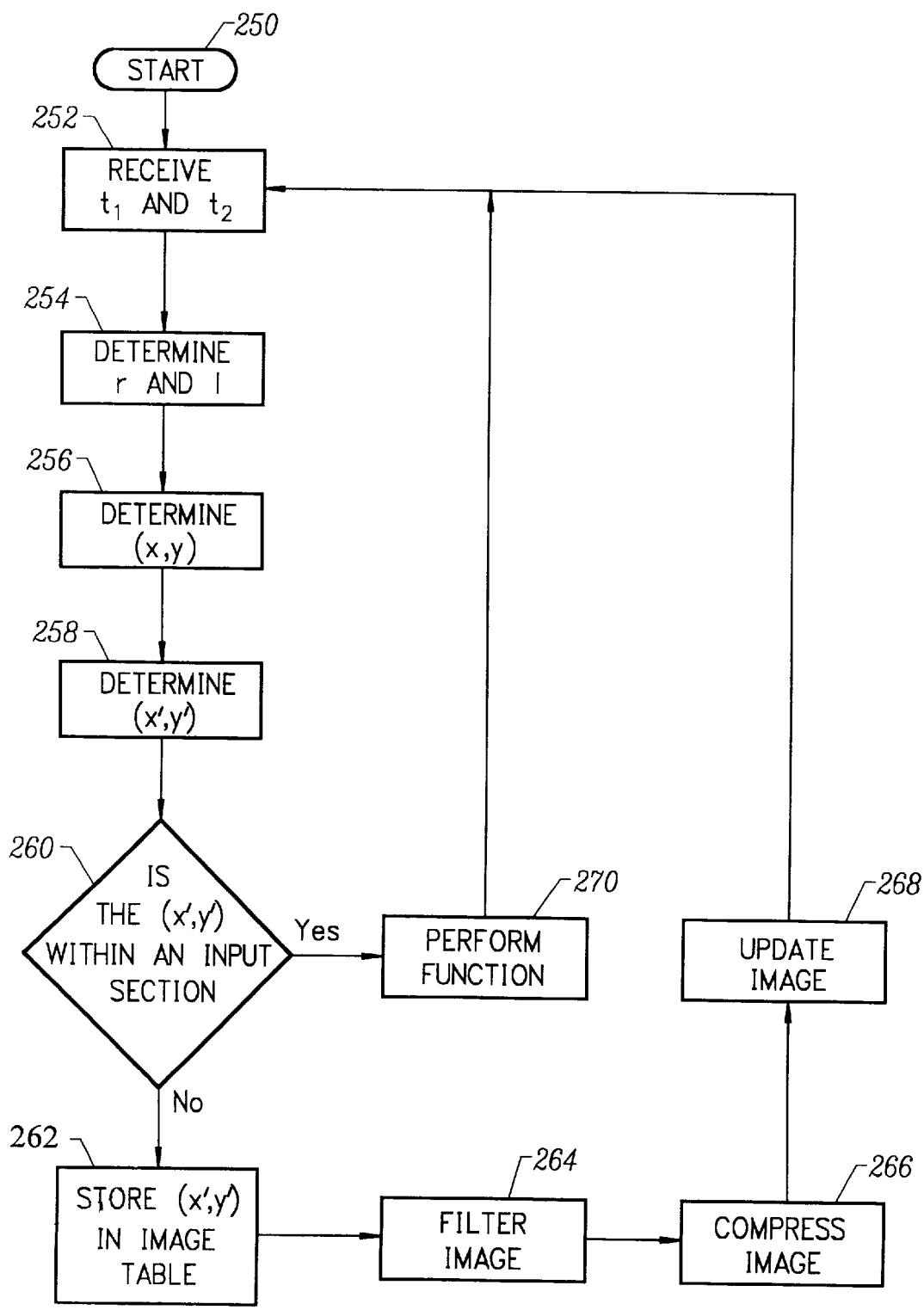
FIG. 14 is a process flow for an image creation flow.

A process flow of the image creation module is illustrated in FIG. 14. Control is passed from the start block 250 to process block 252. At process block 252, the bus is monitored until a time for the position signal 60 to pass from the stylus 10 to the first detector 12A and the second detector 12B, $t_1$ and $t_2$, is received. Control is then passed to process block 254 where r and 1 are calculated by multiplying $t_1$ and $t_2$ by the speed of sound. Control is then passed to process block 256 where Equation 1 and Equation 2 of FIG. 11 are used to determine x and y. Control is then passed to process block 258 where x is normalized by dividing x by W and y is normalized by dividing y by H. The normalized x and y define a normalized position of the stylus 10, (x',y').

Control is passed from process block 258 to decision block 260. At decision block 260, a determination is made whether the position defined by (x', y') is within any of the input sections 46 of the calibration pad 18. The determination can be made by comparing the (x', y') with the coordinates sets listed in the input section table. When the determination is negative, control is passed form decision block 260 to process block 262 where the current position of the stylus 10 is stored in the image table.

Control is passed from process block 262 to process block 264 where the image table is filtered. A moving average of a series of positions in the position table is performed and the positions outside a pre-determined limit rejected. Control is then passed to process block 266 where the image table is compressed. A single line can be represented as only two positions. As a result, redundant positions along a line can be eliminated to reduce the number of positions necessary to create the monitor image 44. The compression can take the form of fitting the series of positions to a more compact form such as a spline.

Control is passed from process block 266 to process block 268 where the monitor image 44 is updated. The monitor image area has a height:width ratio equal to the ration of H:W. The height and width of the monitor image area are each assigned values of 1.0. As a result, the normalized position coordinates will define a position on the monitor image area which is proportionate to the position of the stylus 10 on the writing area 32. The monitor image 44 is then updated by creating a line between the most recent entry in the image table and the previous entry in the image table. Control is then returned to process block 252.

When the determination at decision block 260 is positive, control is passed to process block 270. At process block 270, the function listed in the function field correlated with the input section 46 where the stylus 10 is positioned is performed. For instance, a new monitor image area may be placed on the monitor 22 so a new monitor 22 can be created or the previous monitor 22 may be saved. After the function is performed, control is returned to process block 252.

The processing unit 20 can also include logic which allows the creation of the monitor image 44 to be played back to the user. As a result, the user can re-capture information which has been erased or can extract information from the actual creation of the monitor image 44.

Further, the user can stop the playback at a particular point and edit the image at the point where it was stopped.

While the present invention is disclosed by reference to the preferred embodiments and examples detailed above, it is to be understood that these examples are intended in an illustrative rather than limiting sense, as it is contemplated that modifications and combinations will readily occur to those skilled in the art, which modifications and combinations will be within the spirit of the invention and the scope of the appended claims.

What is claimed is:

1. A method for use with a transcription system which includes a plurality of signal receivers for positioning above a writing surface and for receiving a position signal transmitted from a stylus through the air when the stylus is positioned adjacent the writing surface, the transcription system using the position signal received by the signal receivers from the stylus to determine a position of the stylus relative to the writing surface, the method including:

positioning a pad at a non-determined position relative to the writing surface, the pad including one or more input sections;

determining the non-determined position of the pad relative to the writing surface by positioning the stylus adjacent the pad where the stylus transmits position signals to the plurality of receivers, and having the transcription system determine the non-predetermined position of the pad based on times of flight of the position signals;

positioning the stylus adjacent a particular input section of the pad, the stylus transmitting a position signal to the plurality of receivers in response;

having the transcription system determine that the stylus has been positioned adjacent the particular input section and perform a function associated with the particular input section in response.

2. A method according to claim 1 wherein the input section is a calibration mark, the function performed by the transcription system being calibration of the transcription system by determining a separation between the signal receivers.

3. A method according to claim 1 wherein the function associated with the input section is modifying an image displayed on a monitor operatively connected to the transcription system, the transcription system modifying the image in response to determining that the stylus contacted a save input section.

4. A method according to claim 1 wherein the function associated with the input section is saving an image displayed on a monitor operatively connected to the transcription system, the transcription system saving the image in response to determining that the stylus contacted a save input section.

5. A method according to claim 1 wherein the function associated with the input section is erasing an image displayed on a monitor operatively connected to the transcription system, the transcription system erasing the image in response to determining that the stylus contacted a save input section.

6. A method according to claim 1 wherein the function associated with the input section is changing a color of an image displayed on a monitor operatively connected to the transcription system, the transcription system changing the color of the image in response to determining that the stylus contacted a save input section.

7. A method according to claim 1 wherein the position signal is a sound wave.

8. A method according to claim 1 wherein the position signal is a radar signal.

9. A method according to claim 1 wherein the position signal is a microimpulse radar signal.

10. A computer readable medium for use with a transcription system which includes a plurality of signal receivers for positioning above a writing surface and for receiving one or more position signals transmitted from a stylus through the air when the stylus is positioned adjacent the writing surface, the transcription system using the position signal received by the signal receivers from the stylus to determine a position of the stylus relative to the writing surface, the computer readable medium including:

logic for taking a file encoding positions of one or more input sections on a pad to be positioned at a non-predetermined position relative to the writing surface and associating with the one or more input sections a function to be performed when the stylus is detected as having been positioned adjacent to one of the input sections;

logic for determining the non-determined position of the pad relative to the writing surface based on times of flight of position signals from the stylus adjacent the pad to the plurality of signal receivers;

logic for determining that the stylus has been positioned adjacent to a particular input section of the pad based on times of flight of position signals from the stylus adjacent the particular input section to the plurality of signal receivers; and logic for causing the transcription system to perform the function associated with the input section in response to determining that the stylus has been positioned adjacent to the particular input section.

11. A computer readable medium according to claim 10 wherein the input section is a calibration mark and the function performed by the transcription system is calibration of the transcription system by determining a separation between the signal receivers.

12. A computer readable medium according to claim 10 wherein the function associated with the input section is modifying an image displayed on a monitor operatively connected to the transcription system, the logic for causing the transcription system to perform a function including logic for causing the transcription system to modify the image in response to determining that the stylus contacted a save input section.

13. A computer readable medium according to claim 10 wherein the function associated with the input section is saving an image displayed on a monitor operatively connected to the transcription system, the logic for causing the transcription system to perform a function including logic for causing the transcription system to save the image in response to determining that the stylus contacted a save input section.

14. A computer readable medium according to claim 10 wherein the function associated with the input section is erasing an image displayed on a monitor operatively connected to the transcription system, the logic for causing the transcription system to perform a function including logic for causing the transcription system to erase the image in response to determining that the stylus contacted a save input section.

15. A transcription system comprising:

a stylus which transmits position signals through the air when positioned above a writing surface;

a plurality of signal receivers for positioning adjacent the writing surface which receive the position signals transmitted from the stylus and produce timing signals in response;

a pad for positioning at a non-predetermined position relative to the writing surface, the pad including one or more input sections; and a processing unit including logic for taking a file encoding positions of the one or more input sections on the pad and associating with each input section a function to be performed when the stylus is detected as having been positioned adjacent the input section, logic for determining the non-determined position of the pad relative to the writing surface based on times of flight of position signals from the stylus adjacent the pad to the plurality of signal receivers, logic for determining that the stylus has been positioned adjacent an input section based on times of flight of position signals from the stylus adjacent the input section to the plurality of signal receivers, and logic for causing the transcription system to perform the function associated with the input section in response to determining that the stylus has been positioned adjacent to the input section.

16. A transcription system according to claim 15 wherein the function is selected from the group consisting of modifying, saving, and erasing an image displayed on a monitor operatively connected to the transcription system.

17. A transcription system according to claim 15 wherein the input section is a calibration mark and the function performed by the transcription system is calibration of the transcription system by determining a separation between the signal receivers.

* * * * *